(12) United States Patent
Kitamura et al.

(10) Patent No.: US 6,498,222 B1
(45) Date of Patent: Dec. 24, 2002

(54) WATER RESISTANCE IMPARTER, INK COMPOSITION, REACTIVE FLUID, AND METHOD OF INK-JET RECORDING WITH TWO FLUIDS

(75) Inventors: Kazuhiko Kitamura, Nagano-Ken (JP); Hitoshi Ota, Nagano-Ken (JP); Tetsuya Aoyama, Nagano-Ken (JP); Nobuo Uotani, Chiba-Ken (JP); Yuji Ito, Chiba-Ken (JP); Hiroshi Takahashi, Chiba-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/744,090
(22) PCT Filed: May 25, 2000
(86) PCT No.: PCT/JP00/03361
§ 371 (c)(1), (2), (4) Date: Mar. 9, 2001
(87) PCT Pub. No.: WO00/71592
PCT Pub. Date: Nov. 30, 2000

(30) Foreign Application Priority Data

May 25, 1999 (JP) ............................ 11-145238
May 25, 1999 (JP) ............................ 11-145271

(51) Int. Cl.$^7$ ............................. C08F 226/02
(52) U.S. Cl. ................. 526/307.2; 526/303.1; 526/307; 526/307.3; 106/31.13; 347/100
(58) Field of Search ............. 526/303.1, 307, 526/307.2, 307.3; 106/31.13; 347/100

(56) References Cited

U.S. PATENT DOCUMENTS 4,659,382 A    4/1987    Kang (List continued on next page.)

FOREIGN PATENT DOCUMENTS

EP    0 434 179    7/1990    ........... C09D/11/10

(List continued on next page.)

OTHER PUBLICATIONS

Patent Abstracts of Japan: Publication No. 11116866 dated Apr. 27, 1999.

(List continued on next page.)

Primary Examiner—Helen L. Pezzuto

(74) Attorney, Agent, or Firm—Ladas & Parry

(57) ABSTRACT

Disclosed is a cationic water-soluble resin which comprises a (co)polymer of, in formula (I), repeating units (a) represented by formula (a) and repeating units (b) represented by formula (b), the content of the repeating units (a) in the (co)polymer being 100 to 0% by mole, the (co)polymer having in its molecule a carboxyl-containing group as one of the terminal groups and an aromatic ring-containing group as the other terminal group. The addition of this resin to ink compositions can realize the formation of images possessing excellent waterfastness and lightfastness and having no significant feathering or color bleeding. Likewise, the addition of this resin to a reaction solution for ink jet recording involving the deposition of two liquids, an ink composition and a reaction solution, onto a recording medium, can realize the formation of images possessing excellent waterfastness and lightfastness and no significant feathering or color bleeding.

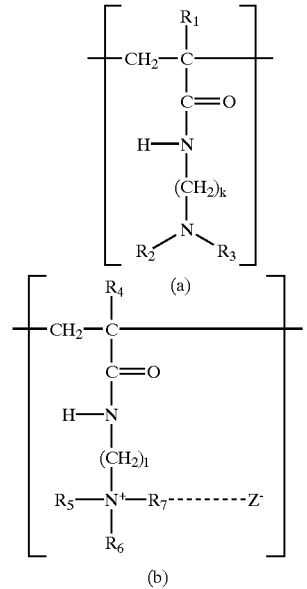

wherein $R_1$ represents hydrogen or methyl; $R_2$ and $R_3$ represent $C_{1-3}$ alkyl; $R_4$ represents hydrogen or methyl; $R_5$, $R_6$, and $R_7$ represent $C_{1-3}$ alkyl; $Z^-$ represents a counter ion; and k and l are each 1, 2, or 3.

49 Claims, 3 Drawing Sheets

U.S. PATENT DOCUMENTS

| | | | |
|---|---|---|---|
| 5,017,224 A | | 5/1991 | Tomita |
| 5,019,164 A | | 5/1991 | Tomita |
| 5,734,403 A | | 3/1998 | Suga |
| 6,165,606 A | * | 12/2000 | Kasahara et al. ............ 428/323 |
| 6,217,166 B1 | * | 4/2001 | Saito et al. ................. 347/100 |

FOREIGN PATENT DOCUMENTS

| | | | |
|---|---|---|---|
| EP | 0 534 634 | 9/1992 | ............ B41M/5/00 |
| JP | 62(1987)-119280 | 5/1987 | ........... C09D/11/00 |
| JP | 62(1987)-238783 | 10/1987 | ............ B41M/5/00 |
| JP | 63(1988)-63764 | 3/1988 | ........... C09D/11/00 |
| JP | 2(1990)-255876 | 10/1990 | ........... C09D/11/02 |
| JP | 2(1990)-296876 | 12/1990 | ............ C09D/5/00 |
| JP | 2(1990)-296878 | 12/1990 | ........... C09D/11/10 |
| JP | 3(1991)-188174 | 8/1991 | ........... C09D/11/00 |
| JP | 3(1991)-240557 | 10/1991 | .............. B41J/2/21 |
| JP | 3(1991)-240558 | 10/1991 | .............. B41J/2/21 |
| JP | 04333694 | 11/1992 | |
| JP | 05(1993)-202328 | 8/1993 | ........... C09D/11/00 |
| JP | 06(1994)-106735 | 4/1994 | .............. B41J/2/21 |
| JP | 07062044 | 3/1995 | |
| JP | 07(1995)-91494 | 10/1995 | ........... C09D/11/00 |
| JP | 07(1995)-305011 | 11/1995 | ........... C09D/11/00 |
| JP | 10306243 | 11/1998 | |
| JP | 11049994 | 2/1999 | |
| JP | 11116866 | 4/1999 | |
| JP | 11246640 | 9/1999 | |

OTHER PUBLICATIONS

Patent Abstracts of Japan: Publication No. 11049994 dated Feb. 23, 1999.
Patent Abstracts of Japan: Publication No. 10306243 dated Nov. 17, 1998.
Patent Abstracts of Japan: Publication No. 11246640 dated Sep. 14, 1999.
Patent Abstracts of Japan: Publication No. 07062044 dated Mar. 7, 1995.
Patent Abstracts of Japan: Publication No. 04333694 dated Nov. 20, 1992.
JPO Abstract 03(1991)–240557, Oct. 25, 1991.
JPO Abstract 03(1991)–240558, Oct. 25, 1991.
JPO Abstract 07(1995)–305011, Nov. 21, 1995.
JPO Abstract 62(1987)–238783, Oct. 19, 1987.
JPO Abstract 63(1988)–63764, Mar. 22, 1988.
JPO Abstract 02(1990)–255876, Oct. 16, 1990.
JPO Abstract 02(1990)–296876, Dec. 12, 1990.

* cited by examiner

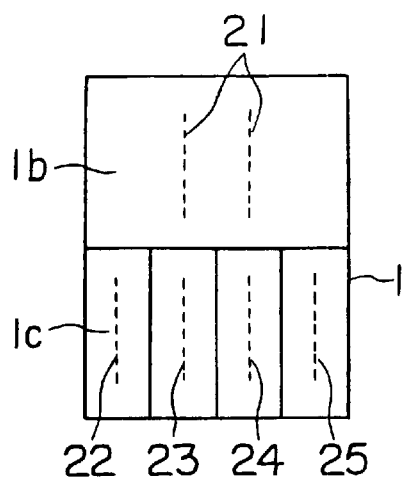
F I G. 2
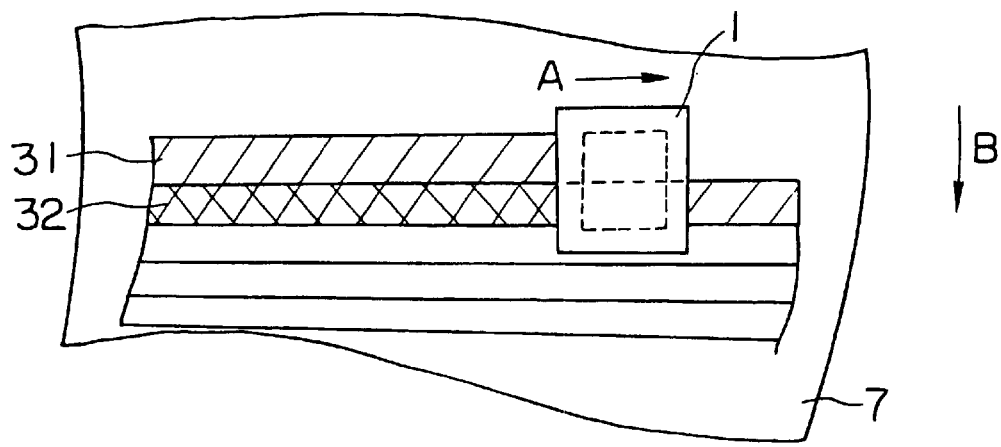
F I G. 3
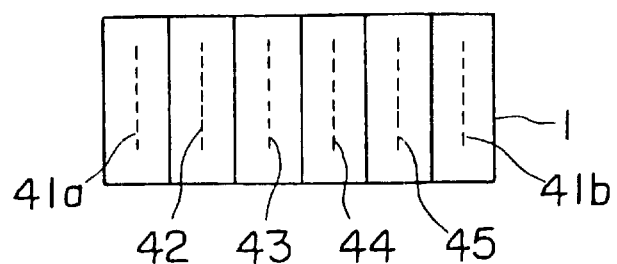
F I G. 4

WATER RESISTANCE IMPARTER, INK COMPOSITION, REACTIVE FLUID, AND METHOD OF INK-JET RECORDING WITH TWO FLUIDS

BACKGROUND OF THE INVENTION

1. Field of the Invention

The present invention relates to a waterfastness-imparting agent comprising a cationic water-soluble resin having a specific structure, an ink composition containing the waterfastness-imparting agent, a reaction solution containing the waterfastness-imparting agent, and ink jet recording methods using the same.

2. Background Art

Realization of images having good waterfastness and lightfastness and, at the same time, having no significant feathering or bleeding is important for printing of images using ink compositions.

In order to realize good waterfastness, as exemplified below, a combination of a cationic resin with an anionic dye has hitherto been used.

For example, Japanese Patent Laid-Open No. 119280/1987 discloses an ink comprising a hydroxyethylated polyethyleneimine polymer and a dye component. This publication describes that the combination of the hydroxyethylated polyethyleneimine polymer with the dye component can develop waterfastness. Japanese Patent Publication No. 91494/1995 discloses an ink comprising a hydroxyalkylated polyallylamine polymer and a dye. This publication describes that the combination of the hydroxyalkylated polyallylamine polymer and the dye can develop waterfastness. In these two inks, however, a further improvement is required to ensure satisfactory waterfastness of printed images because hydroxyalkyl groups having high hydrophilicity are contained in the polymer.

Japanese Patent Laid-Open Nos. 255876/1990, 296878/1990, and 188174/1991 disclose ink compositions comprising a polyamine, with a molecular weight of not less than 300, having primary amino groups, an anionic dye, and a stability-imparting agent. These publications describe that the combination of the primary amino group with the anionic dye can develop waterfastness. Disadvantageously, however, the resins used in these publications strongly attack the dye. Specifically, according to studies conducted by the present inventors, for example, when this ink is allowed to stand at high temperatures, in some cases, the dye is decomposed or otherwise the photodecomposition of the print is accelerated to render the lightfastness lower than that of an ink containing only the dye.

Japanese Patent Laid-Open No. 305011/1995 discloses a water-base ink comprising a basic water-soluble polymer, an anionic dye with the counter ion being a volatile base, and a buffering agent with the counter ion being a volatile base. This publication describes that, in the ink, the volatile base prevents the dissociation of the polymer and, after printing, the volatile base on paper is evaporated to allow a salt-forming reaction between the polymer and the dye to proceed, thereby developing waterfastness.

Japanese Patent Laid-Open No. 238783/1987 discloses an ink jet recording sheet comprising a homopolymer of an acid salt of diallylamine or an acid salt of monoallylamine or a copolymer of the acid salt of diallylamine with the acid salt of monoallylamine. According to the publication, the advantage of this recording sheet is that the polymer reacts with the dye to become insoluble on the recording medium to develop waterfastness. However, since the ink per se does not have waterfastness, use of a recording medium other than described in the publication cannot develop the waterfastness.

Ink jet recording is a printing method wherein droplets of an ink composition are ejected and deposited onto recording media, such as paper, to perform printing. This method has a feature that images having high resolution and high quality can be printed at a high speed by means of relatively inexpensive apparatuses. In general, the ink composition used in the ink jet recording comprises water as a main component and, added thereto, a colorant component and a wetting agent, such as glycerin, for preventing clogging and other purposes.

Furthermore, regarding the ink jet recording method, the application of a polyvalent metal salt solution onto a recording medium followed by the application of an ink composition containing a dye having at least one carboxyl group has been recently proposed (for example, Japanese Patent Laid-Open No. 202328/1993). The advantage of this method is that the polyvalent metal ion combines with the dye to form an insoluble complex, the presence of which can offer an image having waterfastness and high quality free from color bleeding.

Further, the use of a color ink comprising at least a surfactant for imparting a penetrating property or a solvent having a penetrating property and a salt in combination with a black ink capable of being thickened or agglomerated through the action of the salt has been proposed in the art (Japanese Patent Laid-Open No. 106735/1994). The advantage of this method is that high-quality color images having high image density and free from color bleeding can be yielded. Specifically, an ink jet recording method has been proposed wherein two liquids, a liquid containing a salt and an ink composition, are printed to realize good images.

Other ink jet recording methods, wherein two liquids are printed, have also been proposed, for example, in Japanese Patent Laid-Open Nos. 240557/1991 and 240558/1991.

SUMMARY OF THE INVENTION

The present inventors have now found that the addition of a cationic water-soluble resin having a specific structure to an ink composition and a reaction solution for use in ink jet recording involving the deposition of two liquids, an ink composition and a reaction solution, onto a recording medium can realize good images, especially images possessing excellent waterfastness and lightfastness, and having no significant feathering or bleeding. The present invention has been made based on such finding.

Accordingly, it is an object of the present invention to provide a waterfastness-imparting agent which can realize an ink composition and a reaction solution for use in ink jet recording method involving the deposition of two liquids, an ink composition and a reaction solution, onto a recording medium, the method being capable of realizing images possessing excellent waterfastness and lightfastness and having no significant feathering or bleeding.

It is another object of the present invention to provide an ink composition which can realize images possessing excellent waterfastness and lightfastness and, at the same time, having no significant feathering or bleeding.

It is a further object of the present invention to provide a reaction solution for use in ink jet recording using two liquids and an ink jet recording method using the same, the method being capable of realizing images possessing excellent waterfastness and lightfastness and having no significant feathering or bleeding, especially having no significant color bleeding.

According to a first aspect of the present invention, there is provided a waterfastness-imparting agent comprising a cationic water-soluble resin, said cationic water-soluble resin comprising a (co)polymer comprising, in formula (I), repeating units (a) represented by formula (a) and repeating units (b) represented by formula (b), the content of the repeating units (a) in the (co)polymer being 100 to 0% by mole, said (co)polymer having in its molecule a carboxyl-containing group as one of the terminal groups and an aromatic ring-containing group as the other terminal group:

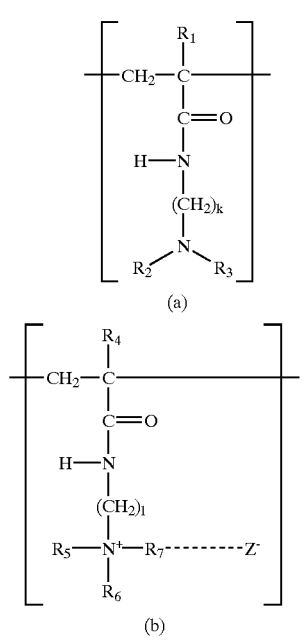

wherein
$R_1$ represents a hydrogen atom or a methyl group;
$R_2$ and $R_3$, which may be the same or different, represent a $C_{1-3}$ alkyl group;
$R_4$ represents a hydrogen atom or a methyl group;
$R_5$, $R_6$, and $R_7$, which may be the same or different, represent a $C_{1-3}$ alkyl group;
$Z^-$ represents a counter ion; and
k and l which may be the same or different, are each 1, 2, or 3.

According to a second aspect of the present invention, there is provided an ink composition comprising at least the cationic water-soluble resin as defined above.

According to a third aspect of the present invention, there is provided a reaction solution for use in ink jet recording method involving the deposition of a reaction solution and an ink composition onto a recording medium to perform printing, the reaction solution comprising at least the cationic water-soluble resin as defined above.

According to a fourth aspect of the present invention, there is provided an ink jet recording method comprising the step of depositing an ink composition and a reaction solution onto a recording medium to perform printing, the reaction solution containing a waterfastness-imparting agent which comprises the cationic water-soluble resin having a specific structure as defined above.

BRIEF DESCRIPTION OF THE DRAWINGS

FIG. 2 is an enlarged view showing a nozzle face of a recording head, wherein 1b designates a nozzle face for a reaction solution and 1c a nozzle face for ink compositions;

FIG. 3 is a diagram illustrating ink jet recording using the recording head shown in FIG. 2, wherein numeral 31 designates a reaction solution-deposited region and numeral 32 a printed region where an ink composition has been printed on a reaction solution-deposited portion;

FIG. 4 is a diagram showing another embodiment of the recording head usable in practicing the present invention, wherein all ejection nozzles are arranged in the lateral direction.

DESCRIPTION OF THE PREFERRED EMBODIMENTS

Waterfastness-imparting Agent Represented by Formula (I)

Figure 1:
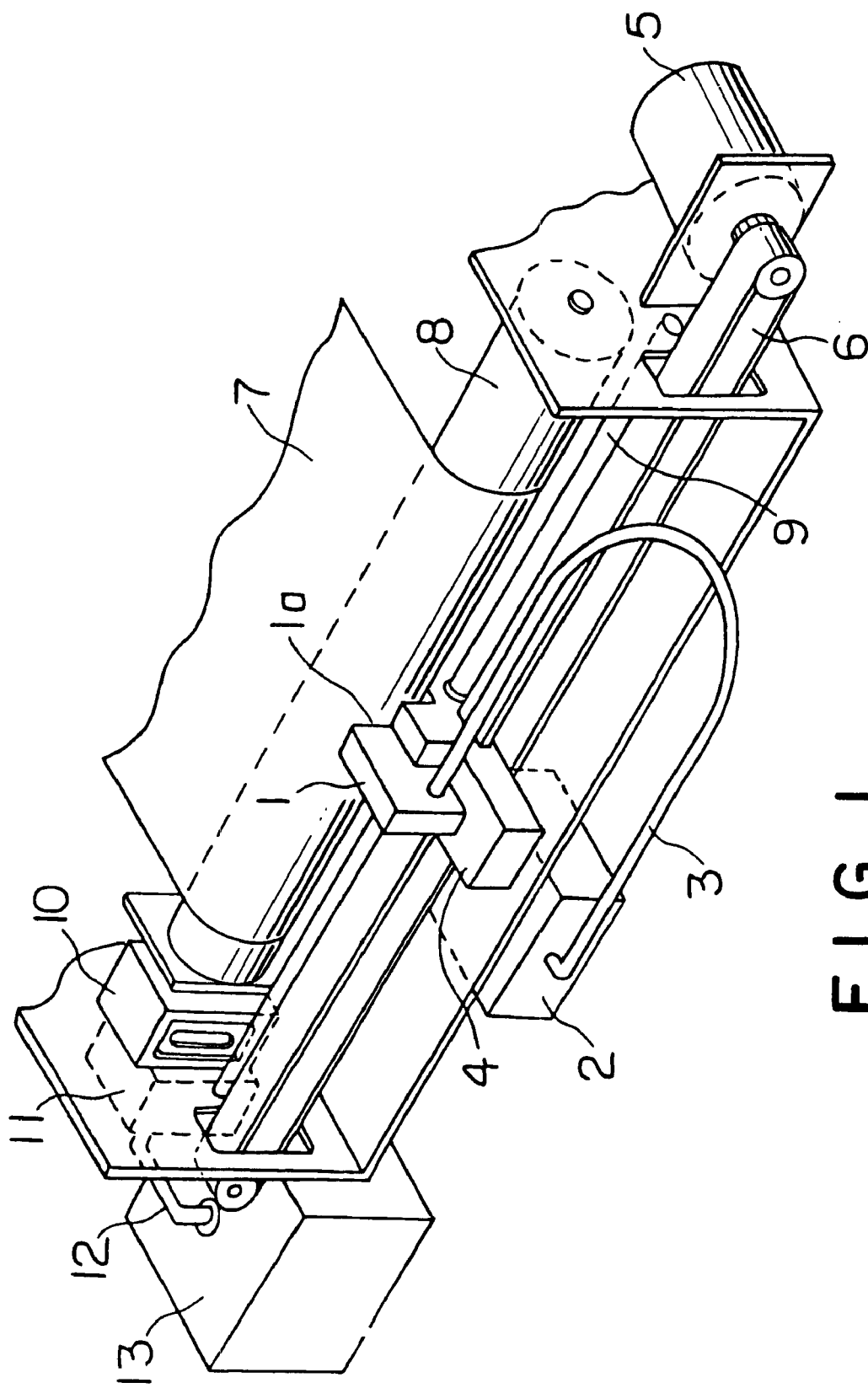
FIG. 1 is a diagram showing an embodiment of an ink jet recording apparatus usable in practicing the present invention, wherein a recording head is provided separately from an ink tank and an ink composition and a reaction solution are fed into the recording head through an ink tube.

The waterfastness-imparting agent comprising a cationic water-soluble resin having a specific structure according to the present invention (hereinafter referred to as "waterfastness-imparting agent") is a (co)polymer comprising, in formula (I), repeating units (a) represented by formula (a) and repeating units (b) represented by formula (b), the content of the repeating units (a) in the (co)polymer being 100 to 0% by mole, the (co)polymer having in its molecule a carboxyl-containing group as one of the terminal groups and an aromatic ring-containing group as the other terminal group. According to the present invention, the "waterfastness-imparting agent" means an additive which, when added to a solution which should be waterfast in a dried form, can impart at least waterfastness to a dried product of the solution. Specifically, the waterfastness-imparting agent means an additive which, when added to an ink composition, can impart at least waterfastness to an image yielded by the ink composition. Furthermore, it means an additive which, when added to a reaction solution can impart at least waterfastness to an image formed by the ink jet recording method involving the deposition of two liquids, the reaction solution and an ink composition, onto a recording medium to perform printing,.

The ink composition, to which the waterfastness-imparting agent according to the present invention has been added, can realize images having no significant feathering or bleeding and having excellent waterfastness. Further, since the colorant is strongly fixed onto the recording medium, the effect of realizing images having no significant feathering or bleeding is significant.

Furthermore, the waterfastness-imparting agent according to the present invention, when brought into contact with an ink composition, is considered to break the state of dissolution and/or dispersion of a colorant, an optional resin emulsion described below, and other ingredients of the ink composition and to agglomerate them. Therefore, in the so-called "ink jet recording using two liquids," when this waterfastness-imparting agent is added to the reaction solution, it is considered that the agglomerate can inhibit the penetration of the colorant into the recording medium. As a result, images having high color density and free from significant feathering and significant unevenness of printing can be realized. Further, in the case of color images, uneven color mixing in boundaries of different colors, that is, color bleeding, can also be advantageously prevented.

In the waterfastness-imparting agent represented by formula (I), $R_1$ and $R_4$ may be the same or different and each independently represent a hydrogen atom or a methyl group. $R_2$, $R_3$, $R_5$, $R_6$, and $R_7$ may be the same or different and each independently represent a $C_{1-3}$ alkyl group, preferably a methyl group. Most preferably, a combination is preferred wherein $R_1$ represents a hydrogen atom, $R_2$ represents a methyl group, $R_3$ represents a methyl group, $R_4$ represents a hydrogen atom, $R_5$ represents a methyl group, $R_6$ represents a methyl group, and $R_7$ represents a methyl group.

$Z^-$ represents a counter ion, and Z preferably represents a halogen atom, that is, a fluorine, chlorine, bromine, or iodine atom, more preferably a chlorine atom.

In formula (I), k and l are each 1, 2, or 3, preferably 3.

Examples of carboxyl-containing terminal groups include groups represented by formulae (II) to (V).

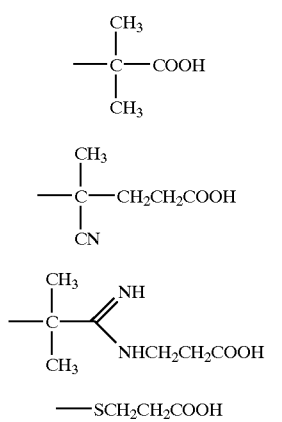

(II)

(III)

(IV)

(V)

Examples of aromatic ring-containing terminal groups include groups represented by formulae (VI) to (XVII).

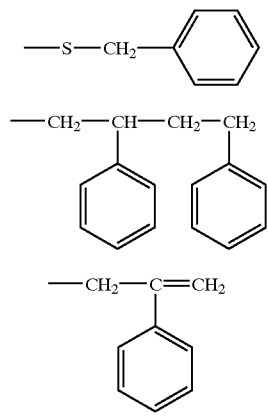

(VI)

(VII)

(VIII)

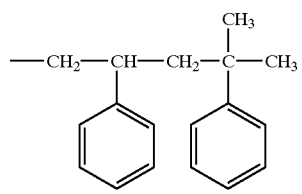

(IX)

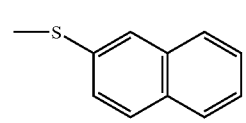

(X)

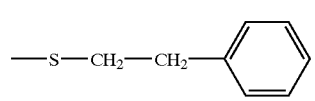

(XI)

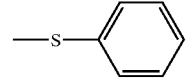

(XII)

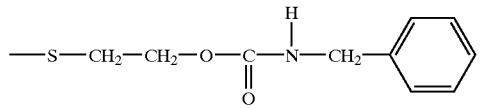

(XIII)

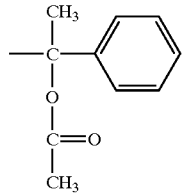

(XIV)

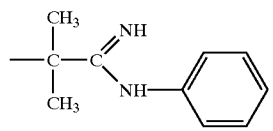

(XV)

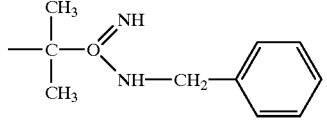

(XVI)

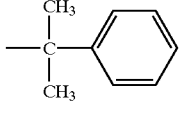

(XVII)

When the waterfastness-imparting agent is added to the ink composition according to the second aspect of the present invention, the content of the units (a) in formula (I) is 100 to 80% by mole, preferably 100 to 90% by mole, more preferably 100 to 95% by mole. The two repeating units may be present in a block or random form.

On the other hand, when the waterfastness-imparting agent is added to the reaction solution according to the third aspect of the present invention, the content of the unit (a) in formula (I) is 100 to 0% by mole, preferably 80 to 0% by mole, more preferably 45 to 0% by mole. The two repeating units may be present in a block or random form.

According to a preferred embodiment of the present invention, the waterfastness-imparting agent has a number average molecular weight of about 1,000 to 10,000 as determined by gel permeation chromatography (hereinafter abbreviated to "GPC").

Ink Composition

The ink composition according to the second aspect of the present invention is used in recording methods using ink compositions, for example, ink jet recording, recording method using writing utensils, such as pens, and other various recording methods. Particularly preferably, the ink composition according to the present invention is used in the ink jet recording method.

The ink composition according to the present invention basically comprises at least an alkali-soluble colorant, a water-soluble organic solvent, water, a waterfastness-imparting agent comprising a cationic water-soluble resin having a specific structure represented by formula (I). As described above, the ink composition with the waterfastness-imparting agent according to the present invention added thereto can realize images having no significant feathering or bleeding and having excellent waterfastness. Further, since the colorant is strongly fixed onto the recording medium, the effect of realizing images having no significant feathering or bleeding is significant.

The amount of the waterfastness-imparting agent represented by formula (I) added may be properly determined so that the above effect can be attained. The waterfastness-imparting agent is added preferably in an amount of about 0.2 to 20% by weight, more preferably about 0.5 to 10% by weight, still more preferably about 0.5 to 5% by weight, based on the ink composition.

The alkali-soluble colorant contained in the ink composition according to the present invention is a dye or a pigment. The term "alkali-soluble" used herein means that the colorant can be dissolved in an alkaline medium. The water-soluble group contained in the molecule may be an acidic or basic dissociative group or nondissociative functional group, or alternatively a plurality of kinds of these groups are present in the molecule. Alkali-soluble colorants may be soluble in acidic solutions so far as they are soluble in alkalis.

The content of the colorant may be properly determined. For example, the colorant is added preferably in an amount of 0.5 to 20% by weight based on the total weight of the ink composition. This is because a colorant content falling within the above range can provide printed images having satisfactory optical density and permits the viscosity of the ink to be easily adjusted to a value suitable for ink jet recording.

More preferably, the colorant is selected from organic dyes or organic pigments. Use of organic dyes or organic pigments is advantageous to realize high color density per weight and vivid colors.

Dyes are organic color materials soluble in water, and preferred dyes are those that fall into categories of acidic dyes, direct dyes, reactive dyes, soluble vat dyes, and food dyes according to the color index. Further, colorants, insoluble in neutral water, falling within categories of oil-soluble dyes and basic dyes according to the color index may also be used so far as they are soluble in aqueous alkali solutions.

On the other hand, pigments may be generally selected from those falling within categories of pigments according to the color index. Although pigments are generally regarded as water-insoluble organic color materials, some pigments are soluble in alkalis and may be used in the present invention.

Examples of dyes and pigments usable herein include:

yellow dyes and pigments, such as C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165, C.I. Direct Yellow 1, 8, 11, 12, 24, 26, 27, 33, 39, 44, 50, 55, 58, 85, 86, 87, 88, 89, 98, 110, 132, 142, and 144, C.I. Reactive Yellow 1, 2, 3, 4, 6, 7, 11, 12, 13, 14, 15, 16, 17, 18, 22, 23, 24, 25, 26, 27, 37, and 42, C.I. Food Yellow 3 and 4, C.I. Solvent Yellow 15, 19, 21, 30, and 109, and C.I. Pigment Yellow 23;

red dyes and pigments, such as C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322, C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231, C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64, C.I. Solubilized Red 1, C.I. Food Red 7, 9, and 14, and C.I. Pigment Red 41, 48, 54, 57, 58, 63, 68, and 81;

blue dyes and pigments, such as C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249, C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249, C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46, C.I. Solubilized Vat Blue 1, 5, and 41, C.I. Vat Blue 29, C.I. Food Blue 1 and 2, C.I. Basic Blue 9, 25, 28, 29, and 44, and C.I. Pigment Blue 1 and 17; and black dyes and pigments, such as C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191, C.I. Direct Black 17, 19, 22, 32, 35, 38, 51, 56, 62, 71, 74, 75, 77, 94, 105, 106, 107, 108, 112, 113, 117, 118, 132, 133, 146, 154, 168, 171, and 195, C.I. Reactive Black 1, 3, 4, 5, 6, 8, 9, 10, 12, 13, 14, and 18, C.I. Solubilized Vat Black 1, and C.I. Food Black 2. These colorants may be used alone or as a mixture of two or more.

According to the ink composition of the present invention, water is a main solvent. Water may be pure water obtained by ion exchange, ultrafiltration, reverse osmosis, distillation or the like, or ultrapure water. Further, water, which has been sterilized, for example, by ultraviolet irradiation or by addition of hydrogen peroxide, is suitable because, when the ink composition is stored for a long period of time, it can prevent the growth of mold or bacteria.

The ink composition according to the present invention may contain an acidic material. Acidic materials usable herein include, for example, inorganic acids, such as hydrochloric acid, bromic acid, hydrofluoric acid, sulfuric acid, phosphoric acid, and nitric acid, and organic acids, such as acetic acid, propionic acid, n-butyric acid, iso-butyric acid, n-valeric acid, glycolic acid, gluconic acid, lactic acid, and toluenesulfonic acid. The addition of these acidic materials to inks can further improve the waterfastness of printed images.

The ink composition according to the present invention can further contain a basic material. Examples of basic materials usable herein include: inorganic bases, such as sodium hydroxide, potassium hydroxide, lithium hydroxide, calcium hydroxide, barium hydroxide, strontium hydroxide, radium hydroxide, berylium hydroxide, magnesium hydroxide, and ammonia; mono-, di- or tri-lower alkylamines, such as ethylamine, diethylamine, triethylamine, propylamine, dipropylamine, diisopropylamine, tert-butylamine, dibutylamine, diisobutylamine, isopropylamine, sec-butylamine, and pentylamine; lower alkyl lower hydroxyalkoxyamines, such as 3-ethoxypropylamine and 3-methoxypropylamine; lower alkyl lower alkoxyamines, such as 3-ethoxypropylamine and 3-methoxypropylamine; mono-, di- or tri-lower hydroxyalkylamines, such as 2-aminoethanol, 2-(dimethylamino)ethanol, 2-(diethylamino)ethanol, diethanolamine, N-butyldiethanolamine, triethanolamine, aminomethylpropanol, and triisopropanolamine; and organic amines, such as iminobispropylamine, .3-diethylaminopropylamine, dibutylaminopropylamine, methylaminopropylamine, dimethylaminopropanediamine, and methyliminobispropylamine. These basic materials can function so that the waterfastness-imparting agent and the colorant can be stably dissolved and held in the ink composition. For example, when an ink is prepared using the waterfastness-imparting agent according to the present invention in combination with a specific colorant, mere mixing is often insufficient for dissolution of these ingredients in the ink. The addition of the basic material permits the waterfastness-imparting agent and the colorant to be stably dissolved in the ink.

In the ink composition according to the present invention, the term "water-soluble organic solvent" refers to a medium which can dissolve solutes of the ink, such as a colorant. Preferably, the water-soluble organic solvent is selected from water-soluble solvents having a lower vapor pressure than water. In addition to solvents which are liquid at room temperature, the following materials may be utilized as the solvent according to the present invention: materials which are solid at room temperature and, upon heat melting, can function as a solvent; and materials which, when used in combination with aqueous solutions or other solvents, can function as a solvent. Examples of water-soluble organic solvents include: polyhydric alcohols, such as ethylene glycol, propylene glycol, butanediol, pentanediol, 2-butene-1,4-diol, 2-methyl-2,4-pentanediol, glycerin, 1,2,6-hexanetriol, diethylene glycol, and dipropylene glycol; ketones, such as acetonylacetone; γ-butyrolactone; esters, such as diacetin and triethyl phosphate; lower alkoxy lower alcohols, such as 2-methoxyethanol and 2-ethoxyethanol; sulfur-containing compounds, such as thiodiglycol, dimethyl sulfoxide, and sulfolane; nitrogen-containing compounds, such as ethyleneurea, prolyleneurea, and 1,3-dimethyl-2-imidazolidinone; ethylene carbonate; propylene carbonate; furfuryl alcohol; and tetrahydrofurfuryl alcohol. Since the vapor pressure of the organic solvent is lower than that of pure water, the content of the organic solvent in the ink does not lower even when the drying of the ink proceeds at the front end of an ink jet head. As a result, the dissolving power of the organic solvent does not lower, and the ink can be stably kept.

The amount of the water-soluble organic solvent added may be properly determined. For example, the addition of the water-soluble organic solvent in an amount of 5 to 50% by weight based on the total amount of the ink is preferred.

According to a preferred embodiment of the present invention, the ink composition according to the present invention may contain a clogging preventive selected from the group consisting of (1) water-soluble hydroxypyridine derivatives, (2) chain or cyclic amide compounds, (3) imidazole derivatives, (4) hydroxy cyclic amine compounds, (5) azole compounds, (6) azine compounds, (7) amidine derivatives, and (8) purine derivatives.

The addition of these clogging preventives can prevent ink from drying at the front end of nozzles even under an extreme condition such that, for example, an ink jet recording apparatus is allowed to stand under high temperature and low humidity conditions for a long period of time. Further, even when the drying of the ink further proceeds to cause solidification, the solid present at the front part of the nozzles can be redissolved by ink supplied from the rear part of the nozzle. Therefore, even after standing for a long period of time, printing can be normally resumed in an early stage.

According to a preferred embodiment of the present invention, the clogging preventive is added preferably in an amount of about 1 to 40% by weight based on the ink composition.

(1) Water-soluble Hydroxypyridine Derivative

The water-soluble hydroxypyridine derivative usable in the present invention refers to a water-soluble compound wherein a hydroxyl group has been bonded to a pyridine ring either directly or through a methylene chain. Specific examples of water-soluble hydroxypyridine derivatives include 2-pyridinol, 3-pyridinol, 4-pyridinol, 3-methyl-2-pyridinol, 4-methyl-2-pyridinol, 6-methyl-2-pyridinol, 2-pyridine methanol, 3-pyridine methanol, 4-pyridine methanol, 2-pyridine ethanol, 3-pyridine ethanol, 4-pyridine ethanol, 2-pyridine propanol, 3-pyridine propanol, 4-pyridine propanol, a -methyl-2-pyridine methanol, and 2,3-pyridinediol. They may be used alone or as a mixture of two or more.

(2) Chain or Cyclic Amide Compound

The water-soluble chain or cyclic amide compound usable in the present invention is a chain amide derivative having 1 to 8 carbon atoms in its molecule, preferably a chain amide derivative having 1 to 6 carbon atoms in its molecule, and a cyclic amide derivative having 4 to 8 carbon atoms in its molecule, preferably a cyclic amide derivative having 4 to 6 carbon atoms in its molecule. Specific examples of water-soluble chain or cyclic amide compounds include lactamides, methyl carbamate, ethyl carbamate, propyl carbamate, formamide, N-methylformamide, N,N-diethylformamide, N, N-dimethylformamide, acetamide, N-methylacetamide, N,N-dimethylacetamide, propionamide, N-methylpropionamide, nicotinamide, 6-aminonicotinamide, N,N-diethylnicotinamide, N-ethylnicotinamide, 2-pyrrolidone, N-methyl-2-pyrrolidone, 5-methyl-2-pyrrolidone, 5-hydroxymethyl-2-pyrrolidone, δ-valerolactam, ε-caprolactam, heptolactam, pyroglutamic acid, N-methyl-ε-caprolactam, and 8-propiolactam. They may be used alone or as a mixture of two or more.

(3) Imidazole Derivative

The imidazole derivative usable in the present invention is a water-soluble compound wherein a hydroxyl group, a carboxyl group, or a lower alkyl (for example, a $C_{1-6}$ alkyl group, preferably a $C_{1-4}$ alkyl) has been attached to an imidazole ring. Specific examples of imidazole derivatives include imidazole, N-methylimidazole, 2-methylimidazole, 2-hydroxyimidazole, 4-hydroxyimidazole, 5-hydroxyimidazole, pyrimidazole, 2-ethylimidazole, 2-ethyl-4-methylimidazole, histamine, histidine, imidazoleacetic acid, 4-methylimidazole, 4-imidazoleacrylic acid, 4,5-imidazoledicarboxylic acid, and pilocarpine. They may be used alone or as a mixture of two or more.

(4) Hydroxy Cyclic Amine Compound

The hydroxy cyclic amine compound usable in the present invention is a water-soluble compound wherein a hydroxyl group has been attached to a cyclic amine (preferably a five- or six-membered cyclic amine) either directly or through a methylene chain. Specific examples of hydroxy cyclic amine compounds include 4-hydroxypiperidine, 3-hydroxypiperidine, 2-hydroxypiperidine, N-methyl-3-hydroxypiperidine, N-ethyl-3-hydroxypiperidine, N-methyl-3-hydroxymethylpiperidine, N-methyl-2-hydroxymethylpiperidine, N-(2-hydroxyethyl)piperidine, 2-(2-hydroxyethyl)piperidine, 4-(2-hydroxyethyl)piperidine, N-(2-hydroxyethyl)piperazine, N-(2-hydroxyethyl)morpholine, N-(2-hydroxypropyl)morpholine, N-(2-hydroxyethyl)pyrrole, pyrrolinol, N-(2-hydroxyethyl)pyrrolidine, N-methyl-2-(2-hydroxyethyl)pyrrolidine, N-(2-hydroxyethyl)ethyleneimine, 3-oxypyrazole, and 5-oxypyrazole. They may be used alone or as a mixture of two or more.

(5) Azole Compound

The azole compound usable in the present invention is a water-soluble five-membered heterocyclic compound having two or more hetero atoms in its ring with at least one hetero atom being nitrogen. In particular, the number of hetero atoms is preferably two or three. The hetero atom is preferably selected form nitrogen, oxygen, and sulfur. Specific examples of azole compounds include 1,2,3-triazole, 1,2,4-triazole, 1,2,3-triazole-4,5-dicarboxylic acid, 1H-1,2,4-triazole-3-thiol, benzotriazole, benzotriazole-5-carboxylic acid, 1H-benzotriazole-1-methanol, pyrazole, tetrazole, oxazole, N-1-(4,5-dimethyl-2-oxazolyl)sulfanylamide, thiazole, 2-aminothiazole, 2-thiazolecarboxyaldehyde, 5-thiazolemethanol, 1,2,3-thiadiazole, benzimidazole, benzimidazole-2-carbamic acid, (2-benzimidazolyl) acetonitrile, 5-benzimidazolecarboxylic acid, 2-benzimidazoleethanol, 2-benzimidazolepropionic acid, and 2-mercaptobenzimidazole. They may be used alone or as a mixture of two or more.

(6) Azine Compound

The azine compound usable in the present invention is a water-soluble six-membered heterocyclic compound having two or more hetero atoms in its ring with at least one hetero atom being nitrogen. In particular, the number of hetero atoms is preferably two or three. The hetero atom is preferably selected form nitrogen, oxygen, and sulfur. The azine compound may have a carboxyl group or a lower alkyl (for example, an alkyl having 1 to 6 carbon atoms, preferably 1 to 4 carbon atoms) as a substituent. Specific examples of azine compounds include pyrazine, pyrazinamide, hexahydropyrazine, 3-ethyl-2,6-dimethylpyrazine, pyrazine-2,3-dicarboxylic acid, pyrazinecarbonitrile, 2,3-pyrazinedicarbonitrile, 2,3-pyrazinecarboxyamide, 2,3-pyrazinedicarboxylic anhydride, pyrazine ethane thiol, triazine, cyanuric acid, methyl cyanurate, melamine, trithiocyanuric acid, pyridazine, 4-pyridazinecarboxylic acid, cytosine, cytosine-5-carboxylic acid. They may be used alone or as a mixture of two or more.

(7) Amidine Derivative

The amidine derivative usable in the present invention is water-soluble and is preferably a guanidine derivative. Specific examples of amidine derivatives include guanidine, 1-methyl-3-nitro-1-nitrosoguanidine, 1-amyl-3-nitro-1-nitrosoguanidine, nitroguanidine, sulfaguanidine, guanidinoacetic acid, guanitidine, aminoguanidine, canavanine, argininosuccinic acid, arginine, and biguanide. They may be used alone or as a mixture of two or more.

(8) Purine Derivative

The purine derivative usable in the present invention is water-soluble, and specific examples thereof include purine, purine riboside, 2-amino-6-mercaptopurine, 6-(methylthio)purine riboside, 6-benzylaminopurine, xanthosine, guanine, 2'-deoxyguanosine, guanosine, 0-methylguanine, methylguanine, caffeine, xanthine, theophylline, theobromine, adenine, adenosine, 2'-deoxyadenosine, N-benzyl-9-(2-tetrahydropyranyl)adenine, and adenosine triphosphate. They may be used alone or as a mixture of two or more.

If necessary, the ink composition according to the present invention may further contain assistants commonly used in ink for ink jet recording. Examples of assistants usable herein include penetrants, viscosity modifiers, surface tension modifiers, hydrotropy agents, humectants, pH adjustors, antimolds, chelating agents, preservatives, and rust preventives.

Penetrants usable herein include: lower alcohols, such as ethanol, isopropanol, butanol, and pentanol; cellosolves, such as ethylene glycol monobutyl ether; carbitols, such as diethylene glycol monobutyl ether and triethylene glycol monobutyl ether; and surfactants.

Surface tension modifiers usable herein include: alcohols, such as diethanolamine, triethanolamine, glycerin, and diethylene glycol; and nonionic, cationic, anionic, or amphoteric surfactants.

Preferred hydrotropy agents usable herein include urea, alkylureas, ethyleneurea, propyleneurea, thiourea, guanidine acid salts, and tetraalkylammonium halides.

Regarding the humectant, glycerin, diethylene glycol or the like may be added as an agent which serves also as the water-soluble organic solvent. Further, saccharides, such as maltitol, sorbitol, gluconic lactone, and maltose, may be added.

Regarding the pH adjustor, the basic material described above may be added as a pH adjustor which serves also as the basic material.

According to a preferred embodiment of the present invention, the ink composition according to the present invention may contain a water-soluble resin other than the waterfastness-imparting agent. Preferred water-soluble resins of this type include nonionic water-soluble resins, and examples thereof include polyacrylamide, hydroxy esters of polymethacrylic acid, such as polyhydroxyethyl methacrylate, polyvinyl pyrrolidone, polyvinyl alcohol, and polyethylene glycol. The addition of these water-soluble resins can further stabilize ink compositions.

Ink Jet Recording Method Using Two Liquids

The ink jet recording Method according to the fourth aspect of the present invention comprises the step of printing a reaction solution and an ink composition onto a recording medium.

The ink jet recording method according to the present invention can realize good images by bringing the reaction solution and the ink composition into contact with each other. The reason why good images can be realized is believed as follows. It should be noted that the following mechanism is merely hypothetical and should not be construed as limiting the present invention. It is believed that, upon the contact of the reaction solution with the ink composition, the waterfastness-imparting agent breaks the state of dissolution and/or dispersion of a colorant, an optional resin emulsion described below, and other ingredients of the ink composition and to agglomerate them. The agglomerate can inhibit the penetration of the colorant into the recording medium and, as a result, images having high color density and free from significant feathering and significant unevenness of printing can be realized. Further, in the case of color images, uneven color mixing in boundaries of different colors, i.e., color bleeding, can also be advantageously prevented.

The waterfastness-imparting agent is stably dissolved in the reaction solution. Upon the deposition of the reaction solution together with the ink composition onto a recording medium, the waterfastness-imparting agent electrostatically interacts with the colorant contained in the ink composition, while this resin interacts also with the recording medium and can be stably fixed onto the recording medium. The fixation of the resin onto the recording medium permits the colorant, together with the resin, to be fixed onto the recording medium, thus imparting waterfastness to the image. Further, as a result of the satisfactory fixation of the colorant onto the recording medium, images having no significant feathering and color bleeding can be realized. Further, advantageously, a combination of the reaction solution containing the waterfastness-imparting agent represented by formula (I) with an ink composition containing a dye could have significantly improved lightfastness. In the prior art, a combination of a polyallylamine used as a cationic water-soluble resin with a dye was disadvantageous in that the lightfastness becomes inferior to that of the dye per se. By contrast, according to the present invention, the use of the waterfastness-imparting agent of formula (I) can realize the retention of the lightfastness of the dye per se. while maintaining the waterfastness of images, which is unattainable by the conventional combination.

The reaction solution and the ink composition may be applied onto the recording medium in any order. Specifically, suitable methods for the deposition of the reaction solution and the ink composition include a method wherein the ink composition is deposited onto the recording medium after the deposition of the reaction solution onto the recording medium, a method wherein the ink composition is first printed onto the recording medium followed by the deposition of the reaction solution onto the recording medium, and a method wherein the reaction solution and the ink composition are mixed together just before or just after the ejection.

The deposition of the reaction solution onto the recording medium may be carried out by any of a method wherein the reaction solution is selectively deposited onto only an area where the ink composition is deposited, and a method wherein the reaction solution is deposited on the whole area of the recording medium. The former method is cost-effective because the consumption of the reaction solution can be minimized. In this method, the accuracy of the position at which both the reaction solution and the ink composition are deposited should be high to some extent. On the other hand, in the latter method, as compared with the former method, the requirement for the accuracy of the position where the reaction solution and the ink composition are deposited is relaxed. In the latter method, a larger amount of the reaction solution should be deposited on the whole area of the recording medium. This is disadvantageously likely to cause curling of recording paper upon drying. For this reason, the method to be used may be determined by taking a combination of the ink composition with the reaction solution into consideration. When the former method is adopted, the reaction solution may be deposited by ink jet recording.

(a) Reaction Solution

The reaction solution used in the ink jet recording method according to the fourth aspect of the present invention basically comprises the waterfastness-imparting agent which, upon contact with an ink composition, can form an agglomerate. According to the present invention, as described above, the reaction solution can break the state of dispersion and/or dissolution of a dye or a pigment, an optional resin emulsion, and other ingredients of the ink composition and to agglomerate them.

The amount of the waterfastness-imparting agent added to the reaction solution may be properly determined so that the above effect can be attained. The waterfastness-imparting agent is added preferably in an amount of about 0.2 to 20% by weight, more preferably about 0.5 to 10% by weight, based on the reaction solution.

According to a preferred embodiment of the present invention, the reaction solution contains an acidic material. Acidic materials usable herein include, for example, inorganic acids, such as hydrochloric acid, bromic acid, hydrofluoric acid, sulfuric acid, phosphoric acid, and nitric acid, and organic acids, such as acetic acid, propionic acid, n-butyric acid, iso-butyric acid, n-valeric acid, glycolic acid, gluconic acid, lactic acid, and toluenesulfonic acid.

According to a preferred embodiment of the present invention, the reaction solution further contains a basic material. Examples of basic materials usable herein include: inorganic bases, such as sodium hydroxide, potassium hydroxide, lithium hydroxide, calcium hydroxide, barium hydroxide, strontium hydroxide, radium hydroxide, berylium hydroxide, magnesium hydroxide, and ammonia; mono-, di- or tri-lower alkylamines, such as ethylamine, diethylamine, triethylamine, propylamine, dipropylamine, diisopropylamine, tert-butylamine, dibutylamine, diisobutylamine, isopropylamine, sec-butylamine, and pentylamine; lower alkyl lower hydroxyalkoxyamines, such as 3-ethoxypropylamine and 3-methoxypropylamine; lower alkyl lower alkoxyamines, such as 3-ethoxypropylamine and 3-methoxypropylamine; mono-, di- or tri-lower hydroxyalkylamines, such as 2-aminoethanol, 2-(dimethylamino)ethanol, 2-(diethylamino)ethanol, diethanolamine, N-butyldiethanolamine, triethanolamine, aminomethylpropanol, and triisopropanolamine; and organic amines, such as iminobispropylamine, 3-diethylaminopropylamine, dibutylaminopropylamine, methylaminopropylamine, dimethylaminopropanediamine, and methyliminobispropylamine.

According to a preferred embodiment of the present invention, the reaction solution of the present invention contains a water-soluble resin other than the waterfastness-imparting agent. Preferred water-soluble resins of this type include nonionic water-soluble resins, and examples thereof include polyacrylamide, hydroxy esters of polymethacrylic acid, such as polyhydroxyethyl methacrylate, polyvinyl pyrrolidone, polyvinyl alcohol, and polyethylene glycol. The addition of these water-soluble resins can further stabilize the reaction solution.

The reaction solution used in the ink jet recording method according to the present invention may contain a polyvalent metal salt. A preferred example of the polyvalent metal salt usable in the reaction solution is a salt that is constituted by divalent or higher polyvalent metal ions and anions bonded to the polyvalent metal ions and is soluble in water. Specific examples of polyvalent metal ions include divalent metal ions, such as $Ca^{2+}$, $Cu^{2+}$, $Ni^{2+}$, $Mg^{2+}$, $Zn^{2+}$, and $Ba^{2+}$, trivalent metal ions, such as $Al^{3+}$, $Fe^{3+}$, and $Cr^{3+}$. Anions include $Cl^-$, $NO_3^-$, $I^-$, $Br^-$, $ClO_3^-$, and $CH_3COO^-$.

Among them, a metal salt constituted by $Ca^{2+}$ or $Mg^{2+}$ provides favorable results in terms of pH of the reaction solution and the quality of prints.

The concentration of the polyvalent metal salt in the reaction solution may be suitably determined so as to attain the effect of providing good print quality and preventing clogging. It, however, is preferably about 0.1 to 40% by weight, more preferably about 5 to 25% by. weight.

According to a preferred embodiment of the present invention, the polyvalent metal salt contained in the reaction solution is constituted by divalent or higher polyvalent metal ions and nitrate ions or carboxylate ions bonded to the polyvalent metal ions and is soluble in water.

In this case, preferably, the carboxylate ions are derived from a saturated aliphatic monocarboxylic acid having 1 to 6 carbon atoms or a carbocyclic monocarboxylic acid having 7 to 11 carbon atoms. Preferred examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid. Among them, formic acid and acetic acid are particularly preferred.

A hydrogen atom(s) on the saturated aliphatic hydrocarbon group in the monocarboxylic acid may be substituted by a hydroxyl group. Preferred examples of such carboxylic acids include lactic acid.

Preferred examples of the carbocyclic monocarboxylic acid having 6 to 10 carbon atoms include benzoic acid and naphthoic acid with benzoic acid being more preferred.

According to a preferred embodiment of the present invention, the reaction solution may contain a wetting agent comprising a high-boiling organic solvent. The high-boiling organic solvent functions to prevent the reaction solution from drying out, thereby preventing clogging of the head. Preferred examples of high-boiling organic solvents usable herein include: polyhydric alcohols, such as ethylene glycol, diethylene glycol, triethylene glycol, polyethylene glycol, polypropylene glycol, propylene glycol, butylene glycol, 1,2,6-hexanetriol, thiodiglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

Although the amount of the high-boiling organic solvent added is not particularly limited, it is preferably about 0.5 to 40% by weight, more preferably about 2 to 20% by weight.

According to a preferred embodiment of the present invention, the reaction solution may further contain a low-boiling organic solvent. Examples of preferred low-boiling organic solvents usable herein include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time required for drying the reaction solution on the recording medium. The low-boiling organic solvent is added preferably in an amount of 0.5 to 10% by weight, more preferably 1.5 to 6% by weight.

According to a preferred embodiment of the present invention, the reaction solution may further contain a penetrant. Penetrants usable herein include various surfactants, such as anionic, cationic, amphoteric, and nonionic surfactants; alcohols, such as methanol, ethanol, and iso-propyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether.

(b) Ink Composition

The ink composition used in the ink jet recording method according to the fourth aspect of the present invention refers to a black ink composition in the case of monochrome printing and color ink compositions in the case of color printing, specifically yellow, magenta, and cyan ink compositions, and optionally a black ink composition.

The ink composition used in the present invention comprises at least a colorant and water.

The colorant contained in the ink composition used in the present invention may be either a dye or a pigment.

Dyes are organic color materials, soluble in water, and preferred dyes are those that fall into categories of acidic dyes, direct dyes, reactive dyes, soluble vat dyes, and food dyes according to the color index. Further, colorants, insoluble in neutral water, falling within categories of oil-soluble dyes, basic dyes, or pigments according to the color index may also be used so far as they are soluble in aqueous alkali solutions.

Specific examples of dyes and alkali-soluble pigments include those described above in connection with the ink composition according to the second aspect of the present invention.

Regarding the pigment, inorganic and organic pigments are usable without particular limitation. Examples of inorganic pigments usable herein include, in addition to titanium oxide and iron oxide, carbon blacks produced by known processes, such as contact, furnace, and thermal processes. Examples of organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigment (for example, basic dye-type chelate pigments and acid dye-type chelate pigment), nitro pigments, nitroso pigments, and aniline black. The content of the colorant may be properly determined. For example, the content of the colorant is preferably 0.5 to 20% by weight based on the total weight of the ink composition. This is because a colorant content falling within the above range can provide printed images having satisfactory optical density and permits the viscosity of the ink to be easily adjusted to a value suitable for ink jet recording.

According to a preferred embodiment of the present invention, pigments among these colorants are brought to a form dispersible in an aqueous medium with the aid of a dispersant or a surfactant or by surface treatment to introduce an anionic functional group thereinto. This permits pigment particles to be stably dispersed in the ink composition. On the other hand, the waterfastness-imparting agent contained in the reaction solution can electrostatically interact with the introduced functional group on recording media to realize sharp images having no significant feathering or color bleeding.

According to a preferred embodiment of the present invention, the ink composition may contain a resin emulsion. The term "resin emulsion" used herein refers to an emulsion comprising water as a continuous phase and the following resin component as a dispersed phase. Resin components as the dispersed phase include acrylic resin, vinyl acetate resin, styrene/butadiene resin, vinyl chloride resin, (meth)acrylate/styrene resin, butadiene resin, styrene resin, crosslinked acrylic resin, crosslinked styrene resin, benzoguanamine resin, phenolic resin, silicone resin, and epoxy resin.

According to a preferred embodiment of the present invention, the resin is a polymer having a combination of a hydrophilic segment with a hydrophobic segment. The particle diameter of the resin component is not particularly limited so far as the resin component can form an emulsion. It, however, is preferably not more than about 150 nm, more preferably about 5 to 100 nm.

The resin emulsion may be prepared by dispersion polymerization of resin monomer, optionally together with a surfactant, in water. For example, an emulsion of an acrylic resin or a styrene/(meth)acrylic resin may be prepared by dispersion polymerization of an ester of (meth)acrylic acid or alternatively styrene in combination with an ester of (meth)acrylic acid in water in the presence of a surfactant. In general, the mixing ratio of the resin component to the surfactant is preferably about 10:1 to 5:1.

When the amount of the surfactant used is in the above amount range, better waterfastness and penetration of ink can be attained. The surfactant is not particularly limited. Preferred examples thereof include: anionic surfactants (for example, sodium dodecylbenzenesulfonate, sodium laurylate, and an ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides). They may be used alone or in combination of two or more. Further, acetylene glycols, for example, Olfine Y, Surfynol 82, Surfynol 104, Surfynol 440, Surfynol 465, and Surfynol 485 (all the above products being manufactured by Air Products and Chemicals Inc.) may also be used.

Further, commercially available resin emulsions may also be used, and examples thereof include Microgel E-1002 and E-5002 (emulsion of styrene/acrylic resin, manufactured by Nippon Paint Co., Ltd.), Voncoat 4001 (emulsion of acrylic resin, manufactured by Dainippon Ink and Chemicals, Inc.), Voncoat 5454 (emulsion of styrene/acrylic resin, manufactured by Dainippon Ink and Chemicals, Inc.), SAE-1014 (emulsion of styrene/acrylic resin, manufactured by Nippon Zeon Co., Ltd.), and Saivinol SK-200 (emulsion of acrylic resin, manufactured by Saiden Chemical Industry Co., Ltd).

The content of the resin emulsion in the ink composition used in the present invention is preferably 0.1 to 40% by weight, more preferably 1 to 25% by weight, in terms of resin component.

The resin emulsion, by virtue of interaction with the waterfastness-imparting agent, can inhibit the penetration of the colorant component and, in addition, has the effect of accelerating the fixation of the colorant component onto a recording medium. Further, some resin emulsions has also the effect of forming a film on the recording medium to improve the rubbing/scratch resistant of prints.

According to a preferred embodiment of the present invention, the ink composition contains a thermoplastic resin in a resin emulsion form. The thermoplastic resin has a softening temperature of 50 to 250° C., preferably 60 to 200° C. Regarding the thermoplastic resin, the term "softening temperature" used herein refers to the lowest temperature among the glass transition point, the melting point, the temperature necessary for providing a viscosity coefficient of $10^{11}$ to $10^{12}$ poises, the fluidized point, and, in the case of a resin emulsion form, the minimum film-forming temperature (MFT) of thermoplastic resin. In the step of heating in the method according to the present invention, the recording medium is heated at a temperature of the softening temperature of the thermoplastic resin or above.

Further, preferably, the thermoplastic resin forms a strong film having waterfastness and rubbing/scratch resistance, when heated at the softening or melting temperature or a higher temperature and then cooled.

Specific examples of water-insoluble thermoplastic resins include, but are not limited to, polyacrylic acid, polymethacrylic acid, a polymethacrylic ester, polyethylacrylic acid, a styrene/butadiene copolymer, polybutadiene, an acrylonitrile/butadiene copolymer, a chloroprene copolymer, a fluororesin, polyvinylidene fluoride, polyolefin resin, cellulose, a styrene/acrylic acid copolymer, a styrene/methacrylic acid copolymer, polystyrene, a styrene/acrylamide copolymer, polyisobutyl acrylate, polyacrylonitrile, polyvinyl acetate, polyvinyl acetal, polyamide, rosin resin, polyethylene, a polycarbonate, a vinylidene chloride resin, a cellulosic resin, a vinyl acetate resin, an ethylene/vinyl acetate copolymer, a vinyl acetate/(meth)acrylate copolymer, a vinyl chloride resin, polyurethane, and a rosin ester.

Specific examples. of low-molecular weight thermoplastic resins include polyethylene wax, montan wax, alcohol wax, synthetic oxide wax, an α-olefin/maleic anhydride copolymer, animal and vegetable waxes such as carnauba wax, lanolin, paraffin wax, and microcrystalline wax.

Conventional resin emulsions may also be used as the resin emulsion. For example, resin emulsions described in Japanese Patent Publication No. 1426/1987 and Japanese Patent Laid-Open Nos. 56573/1991, 79678/1991, 160068/1991, and 18462/1992 as such may be used.

According to a preferred embodiment of the present invention, the ink composition contains an alginic acid derivative. Examples of preferred alginic acid derivatives include alkali metal alginates (for example, sodium salt and potassium salt), organic salts of alginic acid (for example, triethanolamine salt), and ammonium alginate.

The alginic acid derivative is added to the ink composition preferably in an amount of about 0.01 to 1% by weight, more preferably about 0.05 to 0.5% by weight.

The reason why the addition of the alginic acid derivative can realize good images has not been fully elucidated yet. The reason is however believed that a waterfastness-imparting agent in the reaction solution reacts with the alginic acid derivative contained in the ink composition to change the state of dissolution or dispersion of the colorant and consequently to accelerate the fixation of the colorant onto the recording medium.

According to a preferred embodiment of the present invention, the ink composition contains an organic solvent. The organic solvent is preferably a low-boiling organic solvent. Preferred examples thereof include methanol, ethanol, n-propyl alcohol, isopropyl alcohol, n-butanol, sec-butanol, tert-butanol, isobutanol, and n-pentanol. Monohydric alcohols are particularly preferred. The low-boiling organic solvent has the effect of shortening the drying time of the ink.

According to a preferred embodiment of the present invention, the ink composition used in the ink jet recording method according to the fourth aspect of the present invention further contains a wetting agent comprising a high-boiling organic solvent. Preferred examples of high-boiling organic solvents include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

The wetting agent is added preferably in an amount of 0.5 to 40% by weight, more preferably 2 to 20% by weight, based on the ink. The low-boiling organic solvent is added preferably in an amount of 0.5 to 10% by weight, more preferably 1.5 to 6% by weight, based on the ink.

The ink composition used in the present invention may contain a dispersant and a surfactant. Examples of surfactants usable herein include various surfactants described above in connection with the resin emulsion.

According to a preferred embodiment of the present invention, the ink composition contains a saccharide. Examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein means saccharides in the broad sense as including substances which exist widely in the world of nature, such as alginic acid, α-cyclodextrin, and cellulose.

Derivatives of these saccharides usable herein include reducing sugars of the above saccharides (for example, sugar alcohols represented by the general formula $HOCH_2(CHOH)_nCH_2OH$, wherein n is an integer of 2 to 5), oxidizing sugars (for example, aldonic acid or uronic acid), amino acids, and thiosugars. Among them, sugar alcohols are particularly preferred, and specific examples thereof include maltitol and sorbitol.

The saccharide is added suitably in an amount of 0.1 to 40% by weight, preferably 0.5 to 30% by weight, based on the ink composition.

If necessary, pH adjustors, preservatives, antimolds and the like may be added to the ink composition used in the present invention.

According to a preferred embodiment of the present invention, the ink composition according to the second embodiment of the present invention may be used as the ink composition in the ink jet recording method according to the fourth embodiment of the present invention. This can yield high-quality images having excellent waterfastness and lightfastness and a lower level of feathering or bleeding.

(c) Ink Jet Recording Apparatus

An ink jet recording apparatus usable in practicing the ink jet recording method according to the fourth embodiment of the present invention will be described with reference to the accompanying drawings.

FIG. 1 shows an embodiment of an ink jet. recording apparatus. In this embodiment, an ink composition and a reaction solution are accommodated in a tank and fed into a recording head through an ink tube. Specifically, a recording head 1 is communicated with an ink tank 2 through an ink tube 3. In this case, the interior of the ink tank 2 is partitioned, and a chamber for an ink composition, optionally a plurality of chambers respectively for a plurality of color ink compositions, and a chamber for a reaction solution are provided.

The recording head 1 is moved along a carriage 4 by means of a timing belt 6 driven by a motor 5. On the other hand, paper 7 as a recording medium is placed by a platen 8 and a guide 9 at a position facing the recording head 1. In this embodiment, a cap 10 is provided. A suction pump 11 is connected to the cap 10 in order to conduct the so-called "cleaning operation." The ink composition sucked by the suction pump 11 is reservoired in a waste ink tank 13 through a tube 12.

FIG. 2 is an enlarged view showing the surface of nozzles for the recording head 1. In the drawing, the surface of a nozzle for a reaction solution is indicated by 1b, and a nozzle 21 for ejecting the reaction solution is provided in the longitudinal direction. On the other hand, the surface of nozzles for the ink composition is indicated by 1c, and a yellow ink composition, a magenta ink composition, a cyan ink composition, and a black ink composition are ejected respectively through nozzles 22, 23, 24 and 25.

Further, an ink jet recording method using the recording head shown in FIG. 2 will be described with reference to FIG. 3. The recording head 1 is moved in the direction indicated by an arrow A, during which time the reaction solution is ejected through the nozzle surface 1b to form a reaction solution-deposited region 31 in a band form on the recording medium 7. Subsequently, the recording medium 7 is transferred by a predetermined extent in the paper feed direction indicated by an arrow B, during which time the recording head 1 is moved in the direction opposite to that indicated by the arrow A in the drawing and returned to the left end of the recording medium 7, and the recording head 1 conducts printing using the ink composition on the reaction solution-deposited region, thereby forming a print region 32.

Further, as shown in FIG. 4, in the recording head 1, it is also possible to arrange all nozzles in the lateral direction to construct a nozzle assembly. In the drawing, ejection nozzles for a reaction solution are denoted by 41a and 41b, and a yellow ink composition, a magenta ink composition, a cyan ink composition, and a black ink composition are ejected respectively through nozzles 42, 43, 44 and 45. In the recording head according to this embodiment, the recording head 1, when reciprocated on the carriage, can conduct printing in both directions. Therefore, in this case, printing at a higher speed is expected as compared with the case where the recording head shown in FIG. 2 is used.

Regulating the surface tension of the reaction solution and the ink composition preferably by the above method enables a high-quality print to be more stably provided independently of the order of depositing the reaction solution and the ink composition. In this case, use of only one ejection nozzle for the reaction solution suffices for desired results (for example, the nozzle indicated by numeral 41b in the drawing may be omitted), leading to a further reduction in size of head and an increase in printing speed.

In the ink jet recording apparatus, the supplement of the ink composition may be carried out by replacing a cartridge as an ink tank. The ink tank may be integral with the recording head.

Figure 5:
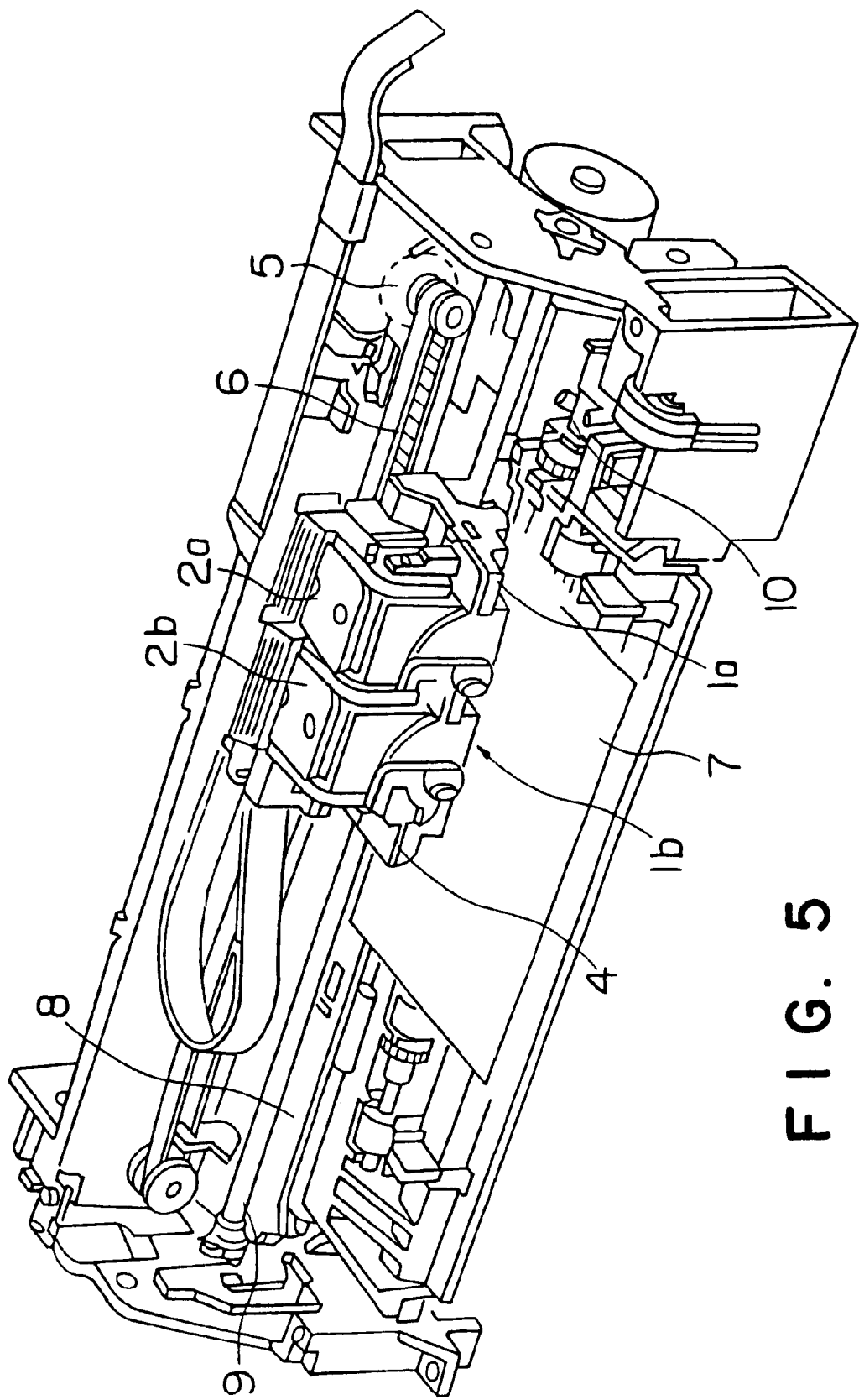
FIG. 5 is a diagram showing another embodiment of the ink jet recording apparatus usable in practicing the present invention, wherein a recording head is integral with an ink tank.

A preferred embodiment of an ink jet recording apparatus using such an ink tank is shown in FIG. 5. In the drawing, the same members as used in the apparatus shown in FIG. 1 have the same reference numerals. In the embodiment shown in FIG. 5, recording heads 1a and 1b are integral respectively with ink tanks 2a and 2b. An ink composition and a reaction solution are ejected respectively through the recording heads 1a and 1b. Basically, printing may be conducted in the same manner as described above in connection with the apparatus shown in FIG. 1. Further, in this embodiment, the recording head 1a is moved together with the ink tank 2a on a carriage 4, while the recording head 1a is moved together with the ink tank 2b on the carriage 4.

EXAMPLES

The present invention will be described in more detail with reference to the following examples, though go it is not limited to these examples only.

Example A

Preparation A1

Preparation of Waterfastness-imparting Agent A1

A 100-ml flask equipped with a thermometer, a stirring device, a nitrogen introduction tube, and a reflux condenser was charged with 15.0 g of N,N-dimethylaminopropylacrylamide, 0.57 g of 2,4-diphenyl-4-methyl-1-pentene, and 20.0 g of n-butyl acetate. A solution of 0.44 g of dimethyl 2,2'-azobis(2-methyl propionate) dissolved in 20.0 g of n-butyl acetate was then added to the flask. The reaction mixture was heated to 80° C. while stirring under a nitrogen atmosphere, and the solution was kept at 80° C. for 4 hr. The reaction mixture was then heated to 95 ° C., and the reaction was continued for additional 2 hr at 95° C., followed by cooling to room temperature to give about 56 g of a pale yellow transparent solution. The solvent was removed under the reduced pressure. A highly viscous liquid as the residue was dissolved in methyl ethyl ketone, and a precipitation procedure from a mixture of methyl ethyl ketone and hexane was repeated several times. The resulting precipitate was dried to give 13.0 g of a solid.

A 100-ml flask equipped with a thermometer, a stirring device, a nitrogen introduction tube, and a reflux condenser was charged with 10.0 g of water and 5.0 g of the solid prepared above. The reaction mixture was heated while stirring under a nitrogen atmosphere, and the solution was then kept at 90° C. for 20 hr, followed by cooling to room temperature. Thus, about 15 g of a pale yellow transparent solution was prepared. The solvent was removed under the reduced pressure. The residue was redissolved in methyl ethyl ketone, and a precipitation procedure from a mixture of methyl ethyl ketone and hexane was repeated several times. The resulting precipitate was dried to give 4.8 g of a solid. The weight-average molecular weight and the number-average molecular weight of the polymer were determined by GPC to be 9,400 and 5,100 respectively, against polyethylene glycol standards.

Preparation A2

Preparation of Waterfastness-imparting Agent A2

A 100-ml flask equipped with a thermometer, a stirring device, a nitrogen introduction tube, and a reflux condenser was charged with 14.0 g of N,N-dimethylaminopropylacrylamide, 1.3 g of a 75 wt % aqueous solution of (3-acrylamidopropyl)trimethylammonium chloride, 0.90 g of 2,4-diphenyl-4-methyl-1-pentene, and 20.0 g of N,N-dimethylformamide. A solution of 1.09 g of dimethyl 2,2'-azobis(2-methyl propionate) dissolved in 20.0 g of N,N-dimethylformamide was then added to the flask. The reaction mixture was heated to 80° C. while stirring under a nitrogen atmosphere, and the solution was kept at 80° C. for 4 hr. The reaction mixture was then heated to 95° C., and the reaction was continued for additional 2 hr at 95° C., followed by cooling to room temperature to give about 57 g of a pale yellow transparent solution. The solvent was removed under the reduced pressure. A highly viscous liquid as the residue was dissolved in methyl ethyl ketone, and a precipitation procedure from a mixture of methyl ethyl ketone and hexane was repeated several times. The resulting precipitate was dried to give 12.3 g of a solid.

A 100-ml flask equipped with a thermometer, a stirring device, a nitrogen introduction tube, and a reflux condenser was charged with 20.0 g of water and 10.0 g of the solid prepared above. The reaction mixture was heated to 90° C. while stirring under a nitrogen atmosphere, and the solution was then kept at 90° C. for 20 hr, followed by cooling to room temperature. Thus, about 30 g of a pale yellow transparent solution was prepared. The solvent was removed under the reduced pressure. The residue was redissolved in methyl ethyl ketone, and a precipitation procedure from a mixture of methyl ethyl ketone and hexane was repeated several times. The resulting precipitate was dried to give 9.6 g of a solid. The weight-average molecular weight and the number-average molecular weight of the polymer were determined by GPC to be 4,200 and 2,800, respectively, against polyethylene glycol standards.

Preparation A3

Preparation of Waterfastness-imparting Agent A3

A 500-ml flask equipped with a thermometer, a stirring device, a nitrogen introduction tube, and a reflux condenser was charged with 52.6 g of N,N-dimethylaminopropylacrylamide, 23.2 g of a 75 wt % aqueous solution of (3-acrylamidopropyl)trimethylammonium chloride, 4.0 g of 2,4-diphenyl-4-methyl-1-pentene, and 130 g of N,N-dimethylformamide. A solution of 5.0 g of dimethyl 2,2'-azobis(2-methyl propionate) dissolved in 20 g of N,N-dimethylformamide was then added to the flask. The reaction mixture was heated to 80° C. while stirring under a nitrogen atmosphere, and the solution was kept at 80° C. for 4 hr. The reaction solution was then heated to 95° C., and the reaction was continued for additional 2 hr at 95° C., followed by cooling to room temperature to give about 230 g of a pale yellow transparent solution. The solvent was removed under the reduced pressure. A highly viscous liquid as the residue was dissolved in methyl ethyl ketone, and a precipitation procedure from a mixture of methyl ethyl ketone and hexane was repeated several times. The resulting precipitate was dried to give 40.3 g of a solid.

A 100-ml flask equipped with a thermometer, a stirring device, a nitrogen introduction tube, and a reflux condenser was charged with 20.0 g of water and 10.0 g of the solid prepared above. The reaction mixture was heated to 90° C. while stirring under a nitrogen atmosphere, and the solution was then kept at 90° C. for 20 hr, followed by cooling to room temperature. Thus, about 30 g of a pale yellow transparent solution was prepared. The solvent was removed under the reduced pressure. The residue was redissolved in methyl ethyl ketone, and a precipitation procedure from a mixture of methyl ethyl ketone and hexane was repeated several times. The resulting precipitate was dried to give 9.2 g of a solid. The weight-average molecular weight and the number-average molecular weight of the polymer were determined by GPC to be 4,800 and 3,200, respectively, against polyethylene glycol standards.

Preparation A4

Preparation of Waterfastness-imparting Agent A4

A 100-ml flask equipped with a thermometer, a stirring device, a nitrogen introduction tube, and a reflux condenser was charged with 15.0 g of N,N-dimethyl-aminopropylacrylamide, 0.57 g of 2,4-diphenyl-4-methyl-1-pentene, and 20.0 g of methanol. A solution of 0.54 g of 4,4'-azobis(4-cyanopentanoic acid) dissolved in 20.0 g of methanol was then added to the flask. The reaction mixture was heated while stirring under a nitrogen atmosphere, and a reaction was allowed to proceed at the boiling point for 15 hr. The reaction mixture was then cooled to room temperature to give about 50 g of a pale yellow transparent solution. The solvent was removed under the reduced pressure. A highly viscous liquid as the residue was dissolved in methyl ethyl ketone, and a precipitation procedure from a mixture of methyl ethyl ketone and hexane was repeated several times. The resulting precipitate was dried to give 13.0 g of a solid. The weight-average molecular weight and the number-average molecular weight of the polymer were determined by GPC to be 8,900 and 4,700, respectively, against polyethylene glycol standards.

Preparation A5

Preparation of waterfastness-imparting agent A5

A 200-ml flask equipped with a thermometer, a stirring device, a nitrogen introduction tube, and a reflux condenser was charged with 15.0 g of N,N-dimethylaminopropylacrylamide, 0.50 g of 3-mercaptopropionic acid, and 60.0 g of n-butyl acetate. Thereafter, 2.00 g of 1,1'-azobis(1-acetoxy-1-phenylethane) was introduced into the solution followed by dissolution with stirring. The reaction mixture was heated to 80° C. while stirring under a nitrogen atmosphere, and the solution was kept at 80° C. for 4 hr. The reaction solution was then heated to 95° C., and the reaction was continued for additional 2 hr at 95° C., followed by cooling to room temperature to give about 77 g of a pale yellow solution. The solvent was removed under the reduced pressure. A highly viscous liquid as the residue was dissolved in acetone, and a precipitation procedure from a mixture of acetone and hexane was repeated several times. The resulting precipitate was dried to give 13.5 g of a solid. The weight-average molecular weight and the number-average molecular weight of the polymer were determined by GPC to be 6,000 and 2,200, respectively, against polyethylene glycol standards.

Preparation A6

Preparation of waterfastness-imparting agent A6

A 100-ml flask equipped with a thermometer, a stirring device, a nitrogen introduction tube, and a reflux condenser was charged with 12.5 g of N,N-dimethylaminoethylacrylamide, 0.83 g of 2,4-diphenyl-4-methyl-1-pentene, and 20.0 g of n-butyl acetate. A solution of 0.41 g of dimethyl 2,2'-azobis(2-methyl propionate) dissolved in 20.0 g of n-butyl acetate was then added to the flask. The reaction mixture was heated to 80° C. while stirring under a nitrogen atmosphere, and the solution was kept at 80° C. for 4 hr. The reaction solution was then heated to 95° C., and the reaction was continued for additional 2 hr at 95° C., followed by cooling to room temperature to give about 56 g of a pale yellow transparent solution. The solvent was removed under the reduced pressure. A highly viscous liquid as the residue was dissolved in methyl ethyl ketone, and a precipitation procedure from a mixture of methyl ethyl ketone and hexane was repeated several times. The resulting precipitate was dried to give 12.0 g of a solid.

A 100-ml flask equipped with a thermometer, a stirring device, a nitrogen introduction tube, and a reflux condenser was charged with 20.0 g of water and 10.0 g of the solid prepared above. The reaction mixture was heated to 90° C. while stirring under a nitrogen atmosphere, and the solution was then kept at 90° C. for 20 hr, followed by cooling to room temperature. Thus, about 30 g of a pale yellow transparent solution was prepared. The solvent was removed under the reduced pressure. The residue was redissolved in methyl ethyl ketone, and a precipitation procedure from a mixture of methyl ethyl ketone and hexane was repeated several times. The resulting precipitate was dried to give 9.0 g of a solid. The weight-average molecular weight and the number-average molecular weight of the polymer were determined by GPC to be 6,700 and 3,800, respectively, against polyethylene glycol standards.

Preparation A7

Preparation of waterfastness-imparting agent A7

A reaction and purification were carried out in the same manner as in Preparation A1, except that the amount of 2,4-diphenyl-4-methyl-1-pentene added was changed to 1.13 g. The yield of the product after drying was 4.5 g. The weight-average molecular weight and the number-average molecular weight of the polymer were determined by GPC to be 4,600 and 2,700, respectively, against polyethylene glycol standards.

Preparation A8

Preparation of Waterfastness-imparting Agent A8

A 100-ml flask equipped with a thermometer, a stirring device, a nitrogen introduction tube, and a reflux condenser was charged with 15.0 g of N,N-dimethylaminopropylmethacrylamide, 0.83 g of 2,4-diphenyl-4-methyl-1-pentene, and 20.0 g of n-butyl acetate. A solution of 0.41 g of dimethyl 2,2'-azobis(2-methyl propionate) dissolved in 20.0 g of n-butyl acetate was then added to the flask. The reaction mixture was heated to 80° C. while stirring under a nitrogen atmosphere, and the solution was kept at 80° C. for 4 hr. The reaction solution was then heated to 95° C., and the reaction was continued for additional 2 hr at 95° C., followed by cooling to room temperature to give about 56 g of a pale yellow transparent solution. The solvent was removed under the reduced pressure. A highly viscous liquid as the residue was dissolved in acetone, and a precipitation procedure from a mixture of acetone and hexane was repeated several times. The resulting precipitate was dried to give 12.9 g of a solid.

A 100-ml flask equipped with a thermometer, a stirring device, a nitrogen introduction tube, and a reflux condenser was charged with 20.0 g of water and 10.0 g of the solid prepared above. The reaction mixture was heated to 90° C. while stirring under a nitrogen atmosphere, and the solution was then kept at 90° C. for 20 hr, followed by cooling to room temperature. Thus, about 31 g of a pale yellow transparent solution was prepared. The solvent was removed under the reduced pressure. The residue was redissolved in acetone, and a precipitation procedure from a mixture of acetone and hexane was repeated several times. The resulting precipitate was dried to give 9.4 g of a solid. The weight-average molecular weight and the number-average molecular weight of the polymer were determined by GPC to be 7,000 and 4,000, respectively, against polyethylene glycol standards.

Preparation A9

Preparation of Waterfastness-imparting Agent A9

A 100-ml flask equipped with a thermometer, a stirring device, a nitrogen introduction tube, and a ref lux condenser was charged with 5.0 g of the product prepared in Preparation A1, and this product in the flask was dissolved in 10.0 g of methyl ethyl ketone and 10.0 g of methanol. Methyl iodide (0.22 g) was gradually added to the solution while stirring the solution. The solution was then heated to 60° C., and a reaction was allowed to proceed at 60° C. for 8 hr. The reaction solution was then cooled to room temperature to give about 24 g of a pale yellow transparent solution. The solvent was removed under the reduced pressure. The residue was redissolved in methanol, and a precipitation procedure from a mixture of methanol and acetone was repeated several times. The resulting precipitate was dried to give 3.5 g of a solid. The weight-average molecular weight and the number-average molecular weight of the polymer were determined by GPC to be 8,600 and 5,300, respectively, against polyethylene glycol standards.

Example A1

Preparation of Ink Set A1

To 2.0 g of the waterfastness-imparting agent A1 prepared in Preparation A1 were added 4 g of C.I. Acid Black 24, 11 g of glycerin, 5 g of 2-pyrrolidinone, and 10 g of diethylene glycol monobutyl ether. Further, ultrapure water was added to bring the total amount of the mixture to 100 g. Thus, a black ink A1 was prepared.

Yellow ink A1, magenta ink A1, and cyan ink A1 were prepared in the same manner as above, except that the dye was changed to 3 g of C.I. Acid Yellow 23 for the yellow ink A1, 2 g of C.I. Acid Red 13 for the magenta ink A1, and 2.5 g of C.I. Acid Blue 9 for the cyan ink A1.

These four inks were combined to give ink set A1.

Example A2

Preparation of Ink Set A2

To 3.0 g of the waterfastness-imparting agent A2 prepared in Preparation A2 were added 3.5 g of C.I. Acid Black 1, 12 g of diethylene glycol, 5 g of 1,3-dimethyl-2-imidazolidinone, 5 g of urea, 7 g of triethylene glycol monobutyl ether, and 0.1 g of potassium hydroxide. Further, ultrapure water was added to bring the total amount of the mixture to 100 g. Thus, a black ink A2 was prepared.

Yellow ink A2, magenta ink A2, and cyan ink A2 were prepared in the same manner as above, except that the dye was changed to 3.0 g of C.I. Acid Yellow 17 for the yellow ink A2, 2.5 g of C.I. Acid Red 1 for the magenta ink A2, and 4.0 g of C.I. Direct Blue 86 for the cyan ink A2.

These four inks were combined to give ink set A2.

Example A3

Preparation of Ink Set A3

To 2.0 g of the waterfastness-imparting agent A3 prepared in Preparation A3 were added 4.5 g of C.I. Direct Black 32, 9 g of glycerin, 5 g of thiodiglycol, 5 g of diethylene glycol monobutyl ether, 10 g of N-methylimidazole, 0.9 g of triethanolamine, 0.2 g of sodium hydroxide, and 1 g of Surfynol 465 (tradename; manufactured by Air Products and Chemicals Inc.). Further, ultrapure water was added to bring the total amount of the mixture to 100 g. Thus, a black ink A3 was prepared.

Yellow ink A3, magenta ink A3, and cyan ink A3 were prepared in the same manner as above, except that the dye was changed to 2 g of Daiwa IJ Yellow 214 HL (tradename; C.I. Direct Yellow 86, manufactured by Daiwa Dye Stuff Mfg. Co., Ltd.) for the yellow ink A3, 6 g of Palatine Fast Pink BN 1 for the magenta ink A3, and 3.5 g of C.I. Direct Blue 199 for the cyan ink A3.

These four inks were combined to give an ink set A3.

Example A4

Preparation of Ink Set A4

To 1.8 g of the waterfastness-imparting agent A4 prepared in Preparation A4 were added 4.5 g of C.I. Direct Black 32, 9 g of glycerin, 5 g of triethylene glycol, 5 g of maltitol, 3 g of L-histidine, 0.6 g of triethanolamine, 2.5 g of ethanol, and 1 g of Surfynol 465 (tradename; manufactured by Air Products and Chemicals Inc.). Further, ultrapure water was added to bring the total amount of the mixture to 100 g. Thus, a black ink A4 was prepared.

Yellow ink A4, magenta ink A4, and cyan ink A4 were prepared in the same manner as above, except that the dye was changed to 2 g of Daiwa IJ Yellow 214 HL (tradename; C.I. Direct Yellow 86, manufactured by Daiwa Dye Stuff Mfg. Co., Ltd.) for the yellow ink A4, 6 g of Palatine Fast Pink BNI for the magenta ink A4, and 3.5 g of C.I. Direct Blue 199 for the cyan ink A4.

These four inks were combined to give an ink set A4.

Example A5

Preparation of Ink Set A5

C.I. Direct Black 19 (6 g) was dissolved in 2.7 g of the waterfastness-imparting agent A5 prepared in Preparation A5. Thiodiglycol (10 g) and 10 g of diethylene glycol monoethyl ether were added to the solution. Further, ultrapure water was added to bring the total amount of the mixture to 100 g. Thus, a black ink A5 was prepared.

Yellow ink A5, magenta ink A5, and cyan ink A5 were prepared in the same manner as above, except that the dye was changed to 3.2 g of MY 123 (tradename; manufactured by Arimoto Chemical Company Ltd.) for the yellow ink A5, 3.2 g of Savinyl Pink 6 BLS (tradename; manufactured by Clariant Japan K.K.) for the magenta ink A5, and 3 g of Valifast Blue 1605 for the cyan ink A5.

These four inks were combined to give an ink set A5.

Example A6

Preparation of Ink Set A6

The waterfastness-imparting agent A6 (3.2 g) prepared in Preparation A6 was mixed with 6 g of C.I. Food Black 2, 12 g of glycerin, 10 g of triethylene glycol monobutyl ether, 5 g of diethylene glycol, 3.0 g of guanidine, and 1.2 g of a nonionic surfactant Surfynol 465. Further, ultrapure water was added to bring the total amount of the mixture to 100 g. Thus, a black ink A6 was prepared.

Yellow ink A6, magenta ink A6, and cyan ink A6 were prepared in the same manner as above, except that the dye was changed to 5 g of C.I. Acid Yellow 23 for the yellow ink A6, 2.5 g of C.I. Acid Red 249 for the magenta ink A6, and 4 g of C.I. Direct Blue 86 for the cyan ink A6. These four inks were combined to give an ink set A6.

Example A7

Preparation of Ink Set A7

To 5.0 g of the waterfastness-imparting agent A7 prepared in Preparation A7 were added 5.0 g of C.I. Acid Black 1, 10 g of glycerin, 5 g of 2-pyrrolidinone, and 10 g of triethylene glycol monobutyl ether. Further, ultrapure water was added to bring the total amount of the mixture to 100 g. Thus, a black ink A7 was prepared.

Yellow ink A7, magenta ink A7, and cyan ink A7 were prepared in the same manner as above, except that the dye was changed to 3.0 g of C.I. Acid Yellow 17 for the yellow ink A7, 2.5 g of C.I. Acid Red 1 for the magenta ink A7, and 4.0 g of C.I. Direct Blue 86 for the cyan ink A7. These four inks were combined to give an ink set A7.

Example A8

Preparation of Ink Set A8

Black ink A8, yellow ink A8, magenta ink A8, and cyan ink A8 were prepared in the same manner as in Example A1, except that 2.8 g of the waterfastness-imparting agent A8 prepared in Preparation A8 was used as the waterfastness-imparting agent and 5 g of thiourea and 5 g of diethylene glycol were additionally used as humectants.

These four inks were combined to give an ink set A8.

Example A9

Preparation of Ink Set A9

Black ink A9, yellow ink A9, magenta ink A9, and cyan ink A9 were prepared in the same manner as in Example A7, except that 1.0 g of the waterfastness-imparting agent A1 prepared in Preparation A1 and 2.2 g of the waterfastness-imparting agent A7 prepared in Preparation A7 were used as the waterfastness-imparting agent.

These four inks were combined to give an ink set A9.

Example A10

Preparation of Ink Set A10

Black ink A10, yellow ink A10, magenta ink A10, and cyan ink A10 were prepared in the same manner as in Example A2, except that 2.7 g of the waterfastness-imparting agent A9 prepared in Preparation A9 was used as the waterfastness-imparting agent and 5 g of urea was changed to 5 g of 2-(dimethylamino)ethanol.

These four inks were combined to give an ink set A10.

Example A11

Preparation of Ink Set A11

To 3.5 g of the waterfastness-imparting agent A7 prepared in Preparation A7 were added 6 g C.I. Direct Black 195, 12 g of glycerin, 10 g of triethylene glycol monobutyl ether, 5 g of tetraethylene glycol, 4 g of 1,3-dimethyl-2-imidazolidinone, and 1 g of a nonionic surfactant Surfynol 465. Further, ultrapure water was added to bring the total amount of the mixture to 100 g. Thus, a black ink A11 was prepared.

Yellow ink A11, magenta ink A11, and cyan ink A11 were prepared in the same manner as above, except that the dye was changed to 5 g of C.I. Acid Yellow 23 for the yellow ink A11, 2.5 g of C.I. Acid Red 249 for the magenta ink A11, and 4 g of C.I. Direct Blue 86 for the cyan ink A11.

These four inks were combined to give an ink set A1.

Example A12 (Comparative)

Preparation of Ink Set A12

Black ink A12, yellow ink A12, magenta ink A12, and cyan ink A12 were prepared in the same manner as in Example A1, except that the waterfastness-imparting agent A1 was not used. These four inks were combined to give an ink set A12.

Example A13 (Comparative)

Preparation of Ink Set A13

Black ink A13, yellow ink A13, magenta ink A13, and cyan ink A13 were prepared in the same manner as in Example A1, except that the waterfastness-imparting agent A1 was changed to SP-200 (tradename; polyethyleneimine, manufactured by Nippon Shokubai Kagaku Kogyo Co., Ltd.). These four inks were combined to give a color ink set A13.

Example A14 (Comparative)

Preparation of Waterfastness-imparting Agent A10 and Ink Set A14

A 500-ml flask equipped with a thermometer, a stirring device, a nitrogen introduction tube, and a reflux condenser was charged with 19.7 g of N,N-dimethylaminopropylacrylamide, 81.3 g of a 75 wt % aqueous solution of (3-acrylamidopropyl)trimethylammonium chloride, 4.0 g of 2,4-diphenyl-4-methyl-1-pentene, and 130 g of N,N-dimethylformamide. A solution of 5.0 g of dimethyl 2,2'-azobis(2-methyl propionate) dissolved in 20 g of N,N-dimethylformamide was then added to the flask. The reaction mixture was heated to 80° C. while stirring under a nitrogen atmosphere, and the solution was kept at 80° C. for 4 hr. The reaction solution was then heated to 95° C., and the reaction was continued for additional 2 hr at 95° C., followed by cooling to room temperature to give about 260 g of a pale yellow solution. The solvent was removed under the reduced pressure. A highly viscous liquid as the residue was dissolved in methanol, and a precipitation procedure from a mixture of methanol and acetone was repeated several times. The resulting precipitate was dried to give 60.1 g of a solid.

A 100-ml flask equipped with a thermometer, a stirring device, a nitrogen introduction tube, and a reflux condenser was charged with 20.0 g of water and 10.0 g of the solid prepared above. The reaction mixture was heated to 90° C. while stirring under a nitrogen atmosphere, and the solution was then kept at 90° C. for 20 hr, followed by cooling to room temperature. Thus, about 30 g of a pale yellow transparent solution was prepared. The solvent was removed under the reduced pressure. The residue was redissolved in methanol, and a precipitation procedure from a mixture of methanol and acetone was repeated several times. The resulting precipitate was dried to give 8.1 g of a solid. The weight-average molecular weight and the number-average molecular weight of the polymer were determined by GPC to be 4,600 and 3,100, respectively, against polyethylene glycol standards.

By the above procedure, a waterfastness-imparting agent A10 having a unit (a) content of 30% by mole was prepared. Black ink A14, yellow ink A14, magenta ink A14, and cyan ink A14 were prepared in the same manner as in Example A3, except that 2.0 g of the waterfastness-imparting agent prepared above was used. These four inks were combined to give an ink set A14.

Evaluation Test on Properties of Ink Compositions

The ink compositions prepared above were evaluated by the following methods.

An ink jet recording printer (a color printer MJ-5000C, manufactured by Seiko Epson Corporation) was modified and used in this test. The inks were filtered through a 5 μm filter before the evaluation test.

Evaluation Test A1

Waterfastness

Acidic plain paper (tradename: Xerox P, manufactured by Fuji Xerox Co., Ltd.) of size A4 was provided as a recording medium. 1.5 cm-width black, yellow, magenta, and cyan full blotted images and letters were printed at intervals of 3.5 cm (nonrecorded area) on the acidic plain paper. The prints thus obtained were allowed to stand under natural environment for one hr, and then immersed in 500 ml of water for one hr. After the immersion, the prints were dried under natural environment for 24 hr. The density of the transfer of the ink onto the nonrecorded area and the residue of the ink on the recorded area were visually inspected. The results were evaluated according to the following criteria.

A: The nonrecorded area was not colored at all, and there was no change in the recorded area.
B: The nonrecorded area was colored for some ink on a level such that did not pose any practical problem.
C: There was significant deposition of ink in the nonrecorded area and a lowering in color density in the recorded area.
D: Coloration of the nonrecorded area and a lowering in color density in the recorded area significantly occurred, and, in particular, some letters disappeared and were illegible.

Evaluation Test A2

Lightfastness

The same recording media and printer as used in evaluation test A1 were used to form full-color images. The prints were evaluated for lightfastness by the whole-day method in the sunlight test according to JIS L 0841. The results were evaluated according to the following criteria.

A: A rating change of less than one as compared with the ink with the waterfastness-imparting agent not added thereto, when evaluation was done using a blue scale as a standard.
B: A rating change of one or two.
C: A rating change exceeding three.

Evaluation Test A3

Environmental Stability

A hermetically sealed container containing the ink was allowed to stand at 60° C. for one day and then at −30° C. for one day. This procedure was repeated 10 times. The inks were then visually inspected for the occurrence of deposits and discoloration. The results were evaluated according to the following criteria.

A: There was no change in the ink.
B: Deposit or discoloration occurred on such a level as will not cause a practical problem.
C: Deposit or discoloration significantly occurred on such a level as will cause a practical problem.

The evaluation results were as summarized in the following table.

TABLE 1

|  | Waterfastness | Lightfastness | Environmental stability |
|---|---|---|---|
| Example A1 | A | A | A |
| Example A2 | A | A | A |
| Example A3 | A | A | A |
| Example A4 | A | A | A |
| Example A5 | A | A | A |
| Example A6 | A | A | A |
| Example A7 | A | A | A |
| Example A8 | A | A | A |
| Example A9 | A | A | A |
| Example A10 | A | A | A |
| Example A11 | A | A | A |
| Example A12 | D | A | A |
| Example A13 | A | C | A |
| Example A14 | A | A | C |

Example B

Preparation B1:

Preparation of Waterfastness-imparting Agent B1

A 100-ml flask equipped with a thermometer, a stirring device, a nitrogen introduction tube, and a reflux condenser was charged with 15.0 g of N,N-dimethylaminopropylacrylamide, 0.57 g of 2,4-diphenyl-4-methyl-1-pentene, and 20.0 g of n-butyl acetate. A solution of 0.44 g of dimethyl 2,2'-azobis(2-methyl propionate) dissolved in 20.0 g of n-butyl acetate was then added to the flask. The reaction mixture was heated to 80° C. while stirring under a nitrogen atmosphere, and the solution was kept at 80° C. for 4 hr. The reaction solution was then heated to 95° C., and the reaction was continued for additional 2 hr at 95° C., followed by cooling to room temperature to give about 56 g of a pale yellow transparent solution. The solvent was removed under the reduced pressure. A highly viscous liquid as the residue was dissolved in methyl ethyl ketone, and a precipitation procedure from a mixture of methyl ethyl ketone and hexane was repeated several times. The resulting precipitate was dried to give 13.0 g of a solid.

A 100-ml flask equipped with a thermometer, a stirring device, a nitrogen introduction tube, and a reflux condenser was charged with 10.0 g of water and 5.0 g of the solid prepared above. The reaction mixture was heated to 90° C. while stirring under a nitrogen atmosphere, and the solution was then kept at 90° C. for 20 hr, followed by cooling to room temperature. Thus, about 15 g of a pale yellow transparent solution was prepared. The solvent was removed under the reduced pressure. The residue was redissolved in methyl ethyl ketone, and a precipitation procedure from a mixture of methyl ethyl ketone and hexane was repeated several times. The resulting precipitate was dried to give 4.8 g of a solid. The weight-average molecular weight and the number-average molecular weight of the polymer were determined by GPC to be 9,400 and 5,100, respectively, against polyethylene glycol standards.

Preparation B2:

Preparation of Waterfastness-imparting Agent B2

A 100-ml flask equipped with a thermometer, a stirring device, a nitrogen introduction tube, and a reflux condenser was charged with 14.0 g of N,N-dimethylaminopropylacrylamide, 1.3 g of a 75 wt % aqueous solution of (3-acrylamidopropyl)trimethylammonium chloride, 0.90 g of 2,4-diphenyl-4-methyl-1-pentene, and 20.0 g of N,N-dimethylformamide. A solution of 1.09 g of dimethyl 2,2'-azobis(2-methyl propionate) dissolved in 20.0 g of N,N-dimethylformamide was then added to the flask. The reaction mixture was heated to 80° C. while stirring under a nitrogen atmosphere, and the solution was kept at 80° C. for 4 hr. The reaction solution was then heated to 95° C., and the reaction was continued for additional 2 hr at 95° C., followed by cooling to room temperature to give about 57 g of a pale yellow transparent solution. The solvent was removed under the reduced pressure. A highly viscous liquid as the residue was dissolved in methyl ethyl ketone, and a precipitation procedure from a mixture of methyl ethyl ketone and hexane was repeated several times. The resulting precipitate was dried to give 12.3 g of a solid.

A 100-ml flask equipped with a thermometer, a stirring device, a nitrogen introduction tube, and a reflux condenser was charged with 20.0 g of water and 10.0 g of the solid prepared above. The reaction mixture was heated to 90° C. while stirring under a nitrogen atmosphere, and the solution was then kept at 90° C. for 20 hr, followed by cooling to room temperature. Thus, about 30 g of a pale yellow transparent solution was prepared. The solvent was removed under the reduced pressure. The residue was redissolved in methyl ethyl ketone, and a precipitation procedure from a mixture of methyl ethyl ketone and hexane was repeated several times. The resulting precipitate was dried to give 9.6 g of a solid. The weight-average molecular weight and the number-average molecular weight of the polymer were determined by GPC to be 4,200 and 2,800, respectively, against polyethylene glycol standards.

Preparation B3:

Preparation of Waterfastness-imparting Agent B3

A 500-ml flask equipped with a thermometer, a stirring device, a nitrogen introduction tube, and a reflux condenser was charged with 52.6 g of N,N-dimethylaminopropylacrylamide, 23.2 g of a 75 wt % aqueous solution of (3-acrylamidopropyl)trimethylammonium chloride, 4.0 g of 2,4-diphenyl-4-methyl-1-pentene, and 130 g of N,N-dimethylformamide. A solution of 5.0 g of dimethyl 2,2'-azobis(2-methyl propionate) dissolved in 20 g of N,N-dimethylformamide was then added to the flask. The reaction mixture was heated to 80° C. while stirring under a nitrogen atmosphere, and the solution was kept at 80° C. for 4 hr. The reaction solution was then heated to 95° C., and the reaction was continued for additional 2 hr at 95° C., followed by cooling to room temperature to give about 230 g of a pale yellow transparent solution. The solvent was removed under the reduced pressure. A highly viscous liquid as the residue was dissolved in methyl ethyl ketone, and a precipitation procedure from a mixture of methyl ethyl ketone and hexane was repeated several times. The resulting precipitate was dried to give 40.3 g of a solid.

A 100-ml flask equipped with a thermometer, a stirring device, a nitrogen introduction tube, and a reflux condenser was charged with 20.0 g of water and 10.0 g of the solid prepared above. The reaction mixture was heated to 90° C. while stirring under a nitrogen atmosphere, and the solution was then kept at 90° C. for 20 hr, followed by cooling to room temperature. Thus, about 30 g of a pale yellow transparent solution was prepared. The solvent was removed under the reduced pressure. The residue was redissolved in methyl ethyl ketone, and a precipitation procedure from a mixture of methyl ethyl ketone and hexane was repeated several times. The resulting precipitate was dried to give 9.2 g of a solid. The weight-average molecular weight and the number-average molecular weight of the polymer were determined by GPC to be 4,800 and 3,200, respectively, against polyethylene glycol standards.

Preparation B4

Preparation of Waterfastness-imparting Agent B4

A reaction and purification were carried out in the same manner as in Preparation B1, except that the amount of 2,4-diphenyl-4-methyl-1-pentene added was changed to 1.13 g. The yield of the product after drying was 4.5 g. The weight-average molecular weight and the number-average molecular weight of the polymer were determined by GPC to be 4,600 and 2,700, respectively, against polyethylene glycol standards.

Preparation B5

Preparation of Waterfastness-imparting Agent B5

A 100-ml flask equipped with a thermometer, a stirring device, a nitrogen introduction tube, and a reflux condenser was charged with 5.0 g of the product prepared in Preparation Bi, and this product in the flask was dissolved in 10.0 g of methyl ethyl ketone and 10.0 g of methanol. Methyl iodide (1.82 g) was gradually added to the solution while stirring the solution. After the completion of the addition of methyl iodide, the solution was heated to 60° C., and a reaction was allowed to proceed at 60° C. for 8 hr. The reaction mixture was then cooled to room temperature to give about 26 g of a pale yellow transparent solution. The solvent was removed under the reduced pressure. The residue was redissolved in methanol, and a precipitation procedure from a mixture of methanol and acetone was repeated several times. The resulting precipitate was dried to give 5.2 g of a solid. The weight-average molecular weight and the number-average molecular weight of the polymer were determined by GPC to be 9,900 and 6,100, respectively, against polyethylene glycol standards.

Preparation B6

Preparation of Waterfastness-imparting Agent B6

A 500-ml flask equipped with a thermometer, a stirring device, a nitrogen introduction tube, and a reflux condenser was charged with 19.7 g of N,N-dimethylaminopropylacrylamide, 81.3 g of a 75 wt % aqueous solution of (3-acrylamidopropyl)trimethylammonium chloride, 4.0 g of 2,4-diphenyl-4-methyl-1-pentene, and 130 g of N,N-dimethylformamide. A solution of 5.0 g of dimethyl 2,2'-azobis(2-methyl propionate) dissolved in 20 g of N,N-dimethylformamide was then added to the flask. The reaction mixture was heated to 80° C. while stirring under a nitrogen atmosphere, and the solution was kept at 80° C. for 4 hr. The reaction solution was then heated to 95° C., and the reaction was continued for additional 2 hr at 95° C., followed by cooling to room temperature to give about 260 g of a pale yellow solution. The solvent was removed under the reduced pressure. A highly viscous liquid as the residue was dissolved in methanol, and a precipitation procedure from a mixture of methanol and acetone was repeated several times. The resulting precipitate was dried to give 60.1 g of a solid.

A 100-ml flask equipped with a thermometer, a stirring device, a nitrogen introduction tube, and a reflux condenser was charged with 20.0 g of water and 10.0 g of the solid prepared above. The reaction mixture was heated to 90° C. while stirring under a nitrogen atmosphere, and the reaction solution was then kept at 90° C. for 20 hr, followed by cooling to room temperature. Thus, about 30 g of a pale yellow transparent solution was prepared. The solvent was removed under the reduced pressure. The residue was redissolved in methanol, and a precipitation procedure from a mixture of methanol and acetone was repeated several times. The resulting precipitate was dried to give 8.1 g of a solid. The weight-average molecular weight and the number-average molecular weight of the polymer were determined by GPC to be 4,600 and 3,100, respectively, against polyethylene glycol standards.

Preparation B7

Preparation of Waterfastness-imparting Agent B7

A 100-ml flask equipped with a thermometer, a stirring device, a nitrogen introduction tube, and a reflux condenser was charged with 20.0 g of a 75 wt % aqueous solution of (3-acrylamidopropyl)trimethylammonium chloride, 2.26 g of 2,4-diphenyl-4-methyl-1-pentene, and 20.0 g of N,N-dimethylformamide. A solution of 1.35 g of dimethyl 2,2'-azobis(2-methyl propionate) dissolved in 20.0 g of N,N-dimethylformamide was then added to the flask. The reaction mixture was heated to 80° C. while stirring under a nitrogen atmosphere, and the solution was kept at 80° C. for 4 hr. The reaction solution was then heated to 95° C., and the reaction was continued for additional 2 hr at 95° C., followed by cooling to room temperature to give about 63 g of a turbid pale yellow solution. The solvent was removed under the reduced pressure. A highly viscous liquid as the residue was dissolved in methanol, and a precipitation procedure from a mixture of methanol and acetone was repeated several times. The resulting precipitate was dried to give 12.3 g of a solid. A 100-ml flask equipped with a thermometer, a stirring device, a nitrogen introduction tube, and a reflux condenser was charged with 20.0 g of water and 10.0 g of the solid prepared above. The reaction mixture was heated to 90° C. while stirring under a nitrogen atmosphere, and the solution was then kept at 90° C. for 20 hr, followed by cooling to room temperature. Thus, about 30 g of a pale yellow transparent solution was prepared. The solvent was removed under the reduced pressure. The residue was redissolved in methanol, and a precipitation procedure from a mixture of methanol and acetone was repeated several times. The resulting precipitate was dried to give 8.5 g of a solid. The weight-average molecular weight and the number-average molecular weight of the polymer were determined by GPC to be 14,000 and 5,700, respectively, against polyethylene glycol standards.

Color Ink Set B1

C.I. Direct Black 195 (6 g), 10 g of glycerin, 10 g of diethylene glycol, and 5 g of 2-pyrrolidone were mixed together. Ultrapure water was added to the mixture to bring the total amount of the mixture to 100 g, followed by filtration through a 5-μm filter to give a black ink B1.

A yellow ink B1, a magenta ink B1, and a cyan ink B1 were prepared in the same manner as above, except that the dye was changed to 2.5 g of C.I. Direct Yellow 132 for the yellow ink B1, 2 g of C.I. Acid Red 249 for the magenta ink B1, and 4 g of C.I. Direct Blue 199 for he cyan ink B1.

These four color inks were combined to give a color ink set B1.

Color ink set B2

C.I. Food Black 2 (10 g), 15 g of glycerin, 5 g of diethylene glycol monobutyl ether, 5 g of diethylene glycol, and 1 g of a nonionic surfactant Surfynol 465 (tradename; manufactured by Air Products and Chemicals Inc.) were mixed together. Further, ultrapure water was added to bring the total amount of the mixture to 100 g. Thus, a black ink B2 was prepared.

Yellow ink B2, magenta ink B2, and cyan ink B2 were prepared in the same manner as above, except that the dye was changed to 5 g of C.I. Acid Yellow 23 for the yellow ink B2, 2.5 g of C.I. Direct Red 9 for the magenta ink B2, and 4 g of C. I. Direct Blue 87 for the cyan ink B2.

These four color inks were combined to give a color ink set B2.

Color Ink Set B3

A carbon black MA 7 (tradename; manufactured by Mitsubishi Chemical Corporation) (5 g), 1 g of a styrene-acrylic acid copolymer (tradename: Joncryl 679, Mw 7,000, acid value 200, manufactured by Johnson Polymer Corp.), and 0.3 g of triethanolamine were mixed together. The mixture, together with glass beads (diameter 1.7 mm, 82.5 g), was dispersed in a sand mill (manufactured by Yasukawa Seisakusho) for 2 hr. Thereafter, the glass beads were removed. Voncoat 4001 (tradename; acrylic resin emulsion, resin component 50% by weight, manufactured by Dainippon Ink and Chemicals, Inc.) (50 g), 0.7 g of sucrose, 6.3 g of maltitol, 10 g of glycerin, 2 g of 2-pyrrolidone, and 4 g of ethanol were added thereto, followed by the addition of ultrapure water to bring the total amount of the mixture to 100 g and mixing with stirring. The mixture was then filtered through a 5-μm filter to give a black ink B3.

A yellow ink B3, a magenta ink B3, and a cyan ink B3 were prepared in the same manner as above, except that the pigment was changed to 2 g of a pigment Ket Yellow 403 (tradename; manufactured by Dainippon Ink and Chemicals, Inc.) for the yellow ink B3, 2 g of a pigment Ket Red 309 (tradename; manufactured by Dainippon Ink and Chemicals, Inc.) for the magenta ink B3, and 2 g of a pigment Ket Blue EX-1 (tradename; manufactured by Dainippon Ink and Chemicals, Inc.) for the cyan ink B3.

These four color inks were combined to give a color ink set B3.

Color Ink Set B4

C.I. Direct Black 19 (6 g), 10 g of glycerin, 10 g of diethylene glycol, 7 g of triethylene glycol monobutyl ether, 0.1 g of sodium alginate (manufactured by Kanto Kogyo K.K.), and 0.8 g of a nonionic surfactant Surfynol 465 (tradename; manufactured by Air Products and Chemicals Inc.) were mixed together. Further, ultrapure water was added to bring the total amount of the mixture to 100 g, followed by filtration through a 5-μm filter to give a black ink B4.

Yellow ink B4, magenta ink B4, and cyan ink B4 were prepared in the same manner as above, except that the dye was changed to 2.5 g of C.I. Direct Yellow 144 for the yellow ink B4, 2 g of C.I. Direct Red 227 for the magenta ink B4, and 4 g of C.I. Acid Blue 9 for the cyan ink B4.

These four color inks were combined to give a color ink set B4.

Color Ink Set B5

Preparation of Ink Set B5

To 2.0 g of the waterfastness-imparting agent B1prepared in Preparation B1 were added 4 g of C.I. Acid Black 24, 11 g of glycerin, 5 g of 2-pyrrolidinone, and 10 g of diethylene glycol monobutyl ether. Further, ultrapure water was added to bring the total amount of the mixture to 100 g. Thus, a black ink B5 was prepared.

Yellow ink B5, magenta ink B5, and cyan ink B5 were prepared in the same manner as above, except that the dye was changed to 3 g of C.I. Acid Yellow 23 for the yellow ink B1, 2 g of C.I. Acid Red 13 for the magenta ink B1, and 2.5 g of C.I. Acid Blue 9 for the cyan ink B1.

These four inks were combined to give ink set B5.

Reaction Solution B1

The waterfastness-imparting agent B1 (4 g) prepared in Preparation B1, 10 g of glycerin, 10 g of diethylene glycol, and 5 g of diethylene glycol monobutyl ether were mixed together. Ultrapure water was added to the mixture to bring the total amount of the mixture to 100 g, followed by filtration through a 5-$\mu$m filter to give a reaction solution B1.

Reaction Solution B2

A reaction solution B2 was prepared in the same manner as described above in connection with the reaction solution B1, except that the waterfastness-imparting agent was changed to 7 g of the waterfastness-imparting agent B6 prepared in Preparation B6 and 8 g of 35% hydrochloric acid was additionally used.

Reaction Solution B3

A reaction solution B3 was prepared in the same manner as described above in connection with the reaction solution B1, except that the waterfastness-imparting agent was changed to 6 g of the waterfastness-imparting agent B5 prepared in Preparation B5 and 5 g of magnesium nitrate hexahydrate was used as a polyvalent metal salt.

Reaction Solution B4

A reaction solution B4 was prepared in the same manner as described above in connection with the reaction solution B1, except that the waterfastness-imparting agent was changed to 5 g of the waterfastness- imparting agent B7 prepared in Preparation B7 and, in addition, 7 g of 35% hydrochloric acid and 5 g of magnesium nitrate hexahydrate as a polyvalent metal salt were used.

Reaction Solution B5

The waterfastness-imparting agent B3 (7 g) prepared in Preparation B3, 8 g of 35% hydrochloric acid, 10 g of glycerin, and 10 g of diethylene glycol were mixed together. Ultrapure water was added to the mixture to bring the total amount of the mixture to 100 g, followed by filtration through a 5-$\mu$m filter to give a reaction solution B5.

Example B1

The color ink set B1 was used in combination with the reaction solution B2, and, for this combination, the following tests on evaluation of properties were carried out.

Example B2

The color ink set B2 was used in combination with the reaction solution B1, and, for this combination, the following tests on evaluation of properties were carried out.

Example B3

The color ink set B3 was used in combination with the reaction solution B4, and, for this combination, the following tests on evaluation of properties were carried out.

Example B4

The color ink set B4 was used in combination with the reaction solution B3, and, for this combination, the following tests on evaluation of properties were carried out.

Example B5

The color ink set B1 was used in combination with the reaction solution B5, and, for this combination, the following tests on evaluation of properties were carried out.

Example B6

The color ink set B2 was used in combination with the reaction solution B5, and, for this combination, the following tests on evaluation of properties were carried out.

Example B7

The color ink set B5 was used in combination with the reaction solution B5, and, for this combination, the following tests on evaluation of properties were carried out.

Example B8 (Comparative)

Only color ink set B1 was provided, and, for the color ink set B1, the following tests on evaluation of properties were carried out.

Example B9 (Comparative)

Only color ink set B3 was provided, and, for the color ink set B3, the following tests on evaluation of properties were carried out.

Example B10 (Comparative)

A reaction solution B6 was prepared in the same manner as described above in connection with the reaction solution B1, except that 4 g (on a solid basis) of PAA-10 (tradename; a 10% aqueous solution of polyallylamine, manufactured by Nitto Boseki Co., Ltd.) was used as the waterfastness-imparting agent. The reaction solution B6 was used in combination with the color ink set B1, and, for this combination, the following tests on evaluation of properties were carried out.

Tests on Evaluation of Properties

The color ink sets prepared above were used in combination with the reaction solutions prepared above, and these combinations were evaluated by the following methods. An ink jet recording printer (a color printer PM-750C, manufactured by Seiko Epson Corporation) was modified and used in this test.

Evaluation test B1

Print Quality (Feathering and Color Bleeding)

Two types of plain papers (tradename: Xerox P and Xerox 4024; both products being manufactured by Fuji Xerox Co., Ltd.) of size A4 and recycled paper (tradename: Xerox R, manufactured by Fuji Xerox Co., Ltd.) of size A4 were provided as recording media. For Examples B1 to B6 and B10, two evaluation tests were carried out. Specifically, in one of the two evaluation tests, the reaction solution was first printed, and, immediately after that, a full-color image was printed using the color ink set. In the other evaluation test, printing was first carried out using the color ink set, and, immediately after that, the reaction solution was printed.

The full-color images thus obtained were visually inspected for feathering and color bleeding. The results were evaluated according to the following criteria.

A: For all the recording media, neither feathering nor color bleeding was observed.

B: For some recording media, slight feathering or color bleeding was observed.

C: For all the recording media, significant feathering or color bleeding was observed.

Evaluation Test B2

Waterfastness

The same recording medium and printer as used in the evaluation test B1 were provided, and, for combinations specified in the examples and the comparative examples, 1.5 cm-width black, yellow, magenta, cyan, red, green, and blue full blotted images and letters were printed at intervals of 3.5 cm (nonrecorded area). The prints thus obtained were allowed to stand under natural environment for one hr, and then immersed in 500 ml of water for one hr. After the immersion, the prints were dried under natural environment for 24 hr, and the density of the transfer of the ink onto the nonrecorded area and the residue of the ink on the recorded area were visually inspected. The results were evaluated according to the following criteria.

A: The nonrecorded area was not colored at all, and there was no change in the recorded area.

B: In some cases, there was coloration of the nonrecorded area and a lowering in color density in the recorded area.

C: Coloration of the nonrecorded area and a lowering in color density in the recorded area significantly occurred, and, in particular, letters disappeared and were illegible.

Evaluation Test B3

Lightfastness

The same recording medium and printer as used in the evaluation test B1 were provided, and, for combinations specified in the examples and the comparative examples, full-color images were printed. For the prints thus obtained, the O.D. value was measured with a color control system SPM 50 (tradename; manufactured by Gretag), before and after exposure to light for one day by means of a xenon fadeometer Ci35W (tradename; manufactured by Atlas Electric Device). The results were evaluated according to the following criteria.

A: Color change and fading of less than 5% in terms of O.D. value

B: Color change and fading of 5 to 20% in terms of O.D. value

C: Color change and fading of more than 20% in terms of O.D. value

The results were as summarized in the following table.

TABLE 2

| Example | Print quality (Printing before deposition of reaction solution)/ (Printing after deposition of reaction solution) | Water-fastness | Light-fastness |
| --- | --- | --- | --- |
| B1 | A/B | A | A |
| B2 | A/A | A | A |
| B3 | A/B | A | A |
| B4 | A/A | A | A |
| B5 | A/A | A | A |
| B6 | A/A | A | A |
| B7 | A/A | A | A |
| B8 | C | C | A |
| B9 | C | B | A |
| B10 | A/B | A | C |

What is claimed is:

1. A waterfastness-imparting agent comprising a cationic water-soluble resin, said cationic water-soluble resin comprising a (co)polymer of, in formula (I), repeating units (a) represented by formula (a) and repeating units (b) represented by formula (b), the content of the repeating units (a) in the (co)polymer being 100 to 0% by mole, said (co)polymer having in its molecule a carboxyl-containing group as one of the terminal groups and an aromatic ring-containing group as the other terminal group:

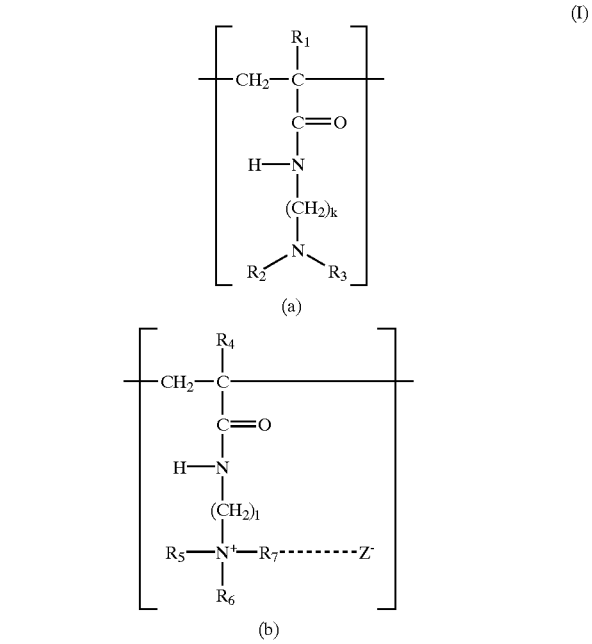

wherein
$R_1$ represents a hydrogen atom or a methyl group;
$R_2$ and $R_3$, which may be the same or different, represent a $C_{1-3}$ alkyl group;
$R_4$ represents a hydrogen atom or a methyl group;
$R_5$, $R_6$, and $R_7$, which may be the same or different, represent a $C_{1-3}$ alkyl group;
$Z^-$ represents a counter ion; and
k and l, which may be the same or different, are each 1, 2, or 3.

2. The waterfastness-imparting agent according to claim 1, which has a number average molecular weight of 1,000 to 10,000.

3. The waterfastness-imparting agent according to claim 1, wherein the carboxyl-containing terminal group is a group selected from the group consisting of formulae (II) to (V):

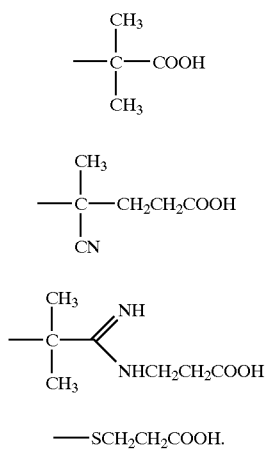

4. The waterfastness-imparting agent according to claim 1, wherein the aromatic ring-containing terminal group is a group selected from the group consisting of formulae (VI) to XVII):

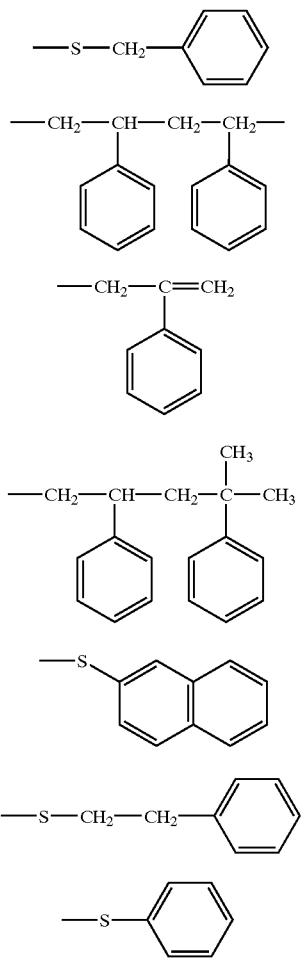

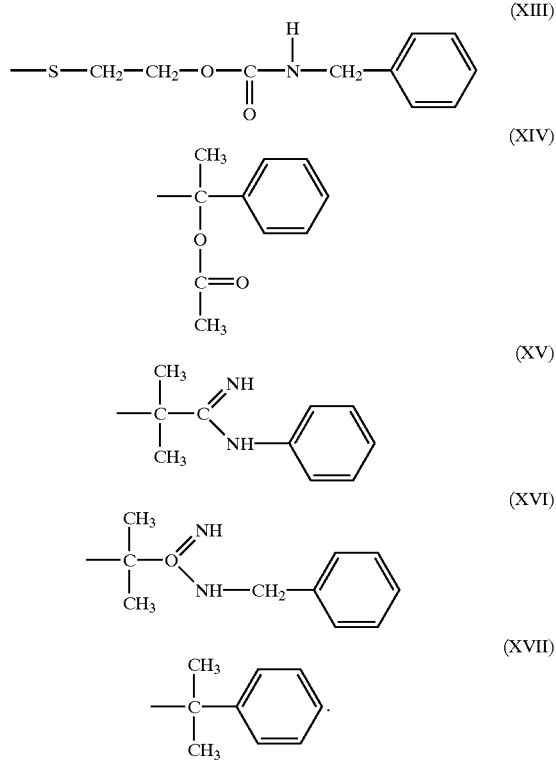

5. The waterfastness-imparting agent according to claim 1, wherein the units (a) and the units (b) are present in a block or random form in the copolymer.

6. The waterfastness-imparting agent according to claim 1, wherein, in the repeating units of formula (I), $R_1$ represents a hydrogen atom and R, represents a hydrogen atom.

7. The waterfastness-imparting agent according to claim 1, wherein, in the repeating units of formula (I), k is 3 and 1 is 3.

8. The waterfastness-imparting agent according to claim 1, wherein, in the repeating units of formula (I), Z represents a halogen atom.

9. An ink composition comprising at least an alkali-soluble colorant, a water-soluble organic solvent, water, and the cationic water-soluble resin as defined in claim 1 with the content of the units (a) being 100 to 80% by mole.

10. The ink composition according to claim 9, wherein the cationic water-soluble resin has a number average molecular weight of 1,000 to 10,000.

11. The ink composition according to claim 9, wherein the carboxyl-containing terminal group in the cationic water-soluble resin is a group selected from the group consisting of formulae (II) to (V):

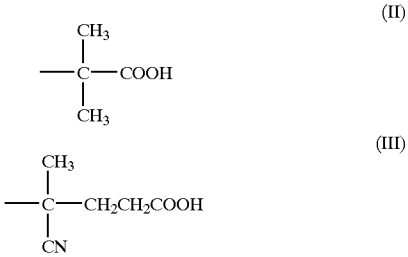

-continued (IV)
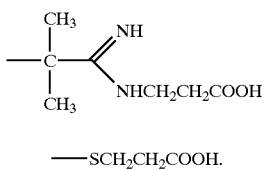

(V)
—SCH₂CH₂COOH.

12. The ink composition according to claim 9, wherein the aromatic ring-containing terminal group in the cationic water-soluble resin is a group selected from the group consisting of formulae (VI) to (XVII):

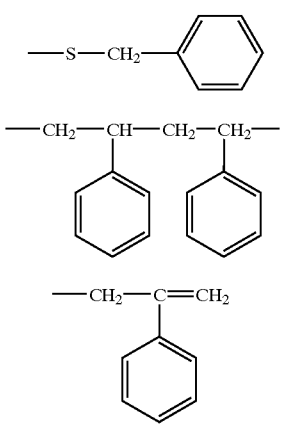

(VI)

(VII)

(VIII)

(IX)

(X)

(XI)

(XII)

(XIII)

(XIV)

-continued (XV)
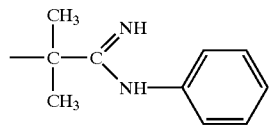

(XVI)
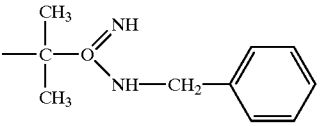

(XVII)
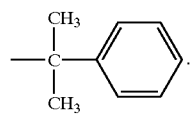

13. The ink composition according to claim 9, wherein the cationic water-soluble resin is a block or random copolymer of the units (a) with the units (b).

14. The ink composition according to claim 9, wherein, in the repeating units represented by formula (I), $R_1$ represents a hydrogen atom and $R_4$ represents a hydrogen atom.

15. The ink composition according to claim 9, wherein, in the repeating units of by formula (I), k is 3 and l is 3.

16. The ink composition according to claim 9, wherein, in the repeating units of formula (I), Z represents a halogen atom.

17. The ink composition according to claim 9, which further comprises an acidic material.

18. The ink composition according to claim 9, which further comprises a basic material.

19. The ink composition according to claim 18, wherein the basic material is a hydroxide of an alkali metal or a hydroxide of an alkaline earth metal.

20. The ink composition according to claim 9, wherein the water-soluble organic solvent has a vapor pressure which is lower than that of water.

21. The ink composition according to claim 9, which comprises 5 to 50% by weight of the water-soluble organic solvent.

22. The ink composition according to claim 9, which further comprises a penetration accelerator selected from the group consisting of lower alcohols, cellosolves, carbitols, and nonionic surfactants.

23. The ink composition according to claim 9, which further comprises a nonionic surfactant and at least one member selected from the group consisting of lower alcohols, cellosolves, and carbitols.

24. The ink composition according to claim 9, wherein the colorant is a dye or a pigment.

25. The ink composition according to claim 9, which further comprises a water-soluble resin other than the cationic water-soluble resin.

26. The ink composition according to claim 9, which further comprises a clogging preventive selected from the group consisting of water-soluble hydroxypyridine derivatives, chain or cyclic amide compounds, imidazole derivatives, hydroxy cyclic amine compounds, azole compounds, azine compounds, amidine derivatives, and purine derivatives.

27. The ink composition according to claim 9, which is used in ink jet recording.

28. A reaction solution for ink jet recording method which comprises the step of depositing a reaction solution and an ink composition onto a recording medium to perform printing, said reaction solution comprising at least the cationic water-soluble resin as defined in claim 1.

29. The reaction solution according to claim 28, wherein the cationic water-soluble resin has a number average molecular weight of 1,000 to 10,000.

30. The reaction solution according to claim 28, wherein the carboxyl-containing terminal group in the cationic water-soluble resin is a group selected from the group consisting of formulae (II) to (V):

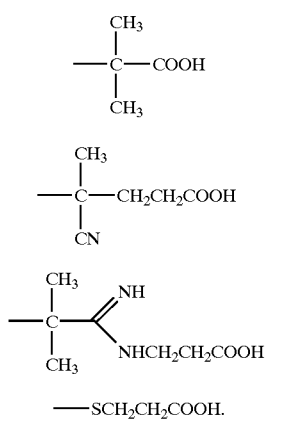

31. The reaction solution according to claim 28, wherein the aromatic ring-containing terminal group in the cationic water-soluble resin is a group selected from the group consisting of formulae (VI) to (XVII):

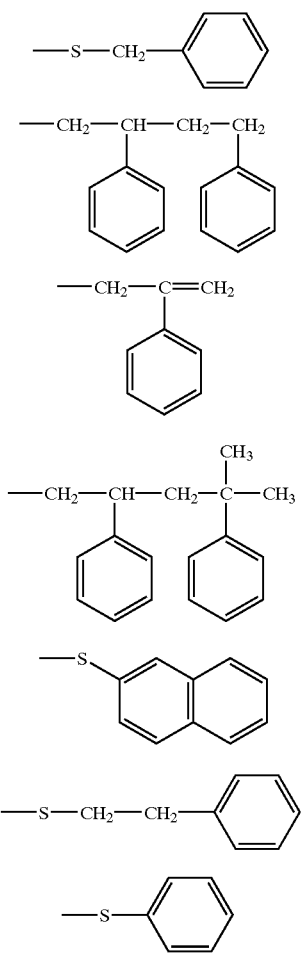

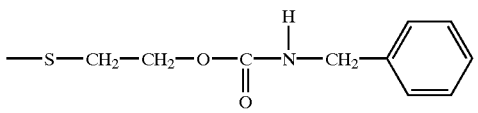

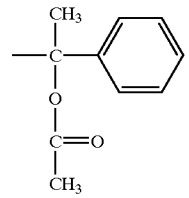

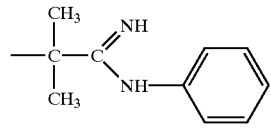

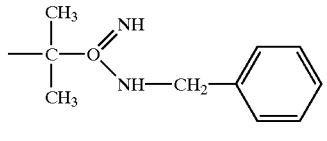

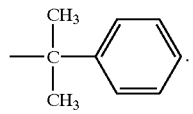

32. The reaction solution according to claim 28, wherein the cationic water-soluble resin is a block or random copolymer of the units (a) with the units (b).

33. The reaction solution for ink jet recording according to claim 28, wherein, in the repeating units of formula (I) constituting the cationic water-soluble resin, $R_1$ represents a hydrogen atom and $R_4$ represents a hydrogen atom.

34. The reaction solution for ink jet recording according to claim 28, wherein, in the repeating units of formula (I) constituting the cationic water-soluble resin, k is 3 and l is 3.

35. The reaction solution for ink jet recording according to claim 28, wherein, in the repeating units of formula (I) constituting the cationic water-soluble resin, Z represents a halogen atom.

36. The reaction solution for ink jet recording according to claim 28, which further comprises an acidic material.

37. The reaction solution for ink jet recording according to claim 28, which further comprises a basic material.

38. The reaction solution for ink jet recording according to claim 37, wherein the basic material is a hydroxide of an alkali metal or a hydroxide of an alkaline earth metal.

39. The reaction solution for ink jet recording according to claim 28, which further comprises a water-soluble resin other than the cationic water-soluble resin.

40. The reaction solution for ink jet recording according to any one of claims 28 to 39, which further comprises a polyvalent metal salt.

41. The reaction solution for ink jet recording according to claim 40, wherein the polyvalent metal salt is a nitrate or a carboxylate.

42. The reaction solution for ink jet recording according to claim 28, which has a pH value of 2 to 10.

43. An ink jet recording method comprising the step of depositing an ink composition and the reaction solution according to claim 28, onto a recording medium to perform printing.

44. The ink jet recording method according to claim 43, wherein the ink composition comprises a pigment or a dye as a colorant.

45. The ink jet recording method according to claim 43, wherein the ink. composition comprises the pigment and a resin emulsion.

46. The ink jet recording method according to claim 43, wherein the step of ejecting droplets of the ink composition onto the recording medium is carried out after the step of depositing the reaction solution onto the recording medium.

47. The ink jet recording method according to claim 43, wherein the step of ejecting droplets of the ink composition onto the recording medium is carried out before the step of depositing the reaction solution onto the recording medium.

48. The ink jet recording method according to claim 43, wherein the ink composition comprises at least an alkali-soluble colorant, a water-soluble organic solvent, water, and the cationic water-soluble resin comprising a (co)polymer of, in formula (I), repeating units (a) represented by formula (a) and repeating units (b) represented by formula (b), the content of the repeating units (a) in the (co)polymer being 100 to 0% by mole, said (co)polymer having in its molecule a carboxyl-containing group as one of the terminal groups and an

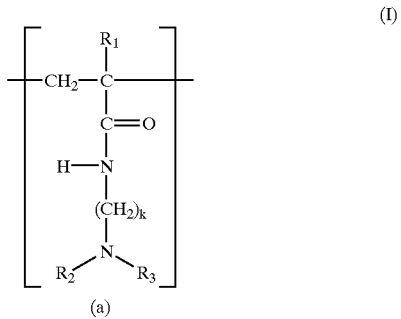

(I)

(a)

-continued

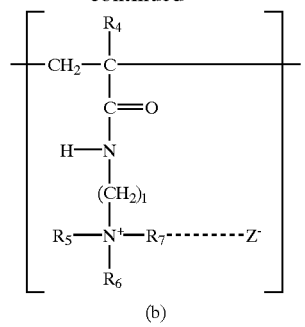

(b)

aromatic ring-containing group as the other terminal group:

wherein $R_1$ represents a hydrogen atom or a methyl group;

$R_2$ and $R_3$, which may be the same or different, represent a $C_{1-3}$ alkyl group;

$R_4$ represents a hydrogen atom or a methyl group;

$R_5$, $R_6$, and $R_7$ which may be the same or different, represent a $C_{1-3}$ alkyl group;

$Z^-$ represents a counter ion; and k and l, which may be the same or different, are each 1, 2, or 3 with the content of the units (a) being 100 to 80% by mole.

49. A record produced by the recording method according to claim 43.

* * * * *